United States Patent [19]

Davis

[11] 4,047,161
[45] Sept. 6, 1977

[54] TASK MANAGEMENT APPARATUS
[75] Inventor: Michael Ian Davis, Boca Raton, Fla.
[73] Assignee: International Business Machines Corporation, Armonk, N.Y.
[21] Appl. No.: 681,953
[22] Filed: Apr. 30, 1976
[51] Int. Cl.$^2$ .......................... G06F 9/19; G06F 9/20
[52] U.S. Cl. ................................................ 364/200
[58] Field of Search ...................... 445/1; 340/172.5

[56] References Cited
U.S. PATENT DOCUMENTS

| | | | |
|---|---|---|---|
| 3,496,551 | 2/1970 | Driscoll et al. | 340/172.5 |
| 3,530,438 | 9/1970 | Mellen et al. | 340/172.5 |
| 3,566,357 | 2/1971 | Ling | 340/172.5 |
| 3,568,157 | 3/1971 | Downing et al. | 340/172.5 |
| 3,643,227 | 2/1972 | Smith et al. | 340/172.5 |
| 3,648,252 | 3/1972 | Thron et al. | 340/172.5 |
| 3,648,253 | 3/1972 | Mullery et al. | 340/172.5 |
| 3,665,415 | 5/1972 | Beard et al. | 340/172.5 |
| 3,665,421 | 5/1972 | Rehhausser et al. | 340/172.5 |
| 3,825,902 | 7/1974 | Brown et al. | 340/172.5 |
| 3,905,025 | 9/1975 | Davis et al. | 340/172.5 |
| 3,916,383 | 10/1975 | Malcolm | 340/172.5 |
| 3,916,385 | 10/1975 | Parmar et al. | 340/172.5 |
| 3,940,745 | 2/1976 | Sajeva | 340/172.5 |

Primary Examiner—Gareth D. Shaw
Assistant Examiner—Jan E. Rhoads
Attorney, Agent, or Firm—John C. Black

[57] ABSTRACT

A data processing system is described which has multiple sets of registers each of which is capable of autonomously controlling a common storage and common arithmetic and logic control circuits to execute respective tasks of a program. Level status blocks (LSBs), each assigned to a respective task, are held in main storage; and each contains such address and status data as is required for task execution in a controlled environment. Apparatus, including a current level register, a selected level register, a pending level register and an in-process bit latch, is controlled during the execution of a load level status block (LLSB) instruction to transfer the LSB of a selected task from storage to the selected register set, determine the status of the in-process bit of the selected task LSB and the relative priority levels of the current and selected tasks, and pursuant to said two determinations handle the task dispatching, preemption, enqueuing, dequeuing functions without the need for further software processing. At the completion of the LLSB instruction execution, either the current task execution is continued, the selected task is initiated, a pending task is initiated or a system wait state is entered. A store level status block (STLSB) instruction is executed to copy the LSB of a selected task from the register set to storage. Hardware backup registers are provided to hold certain updated status of the current register set to improve performance. These backup registers are changed during the LLSB execution if task switching occurs and are restored to the current register set during STLSB execution.

11 Claims, 23 Drawing Figures

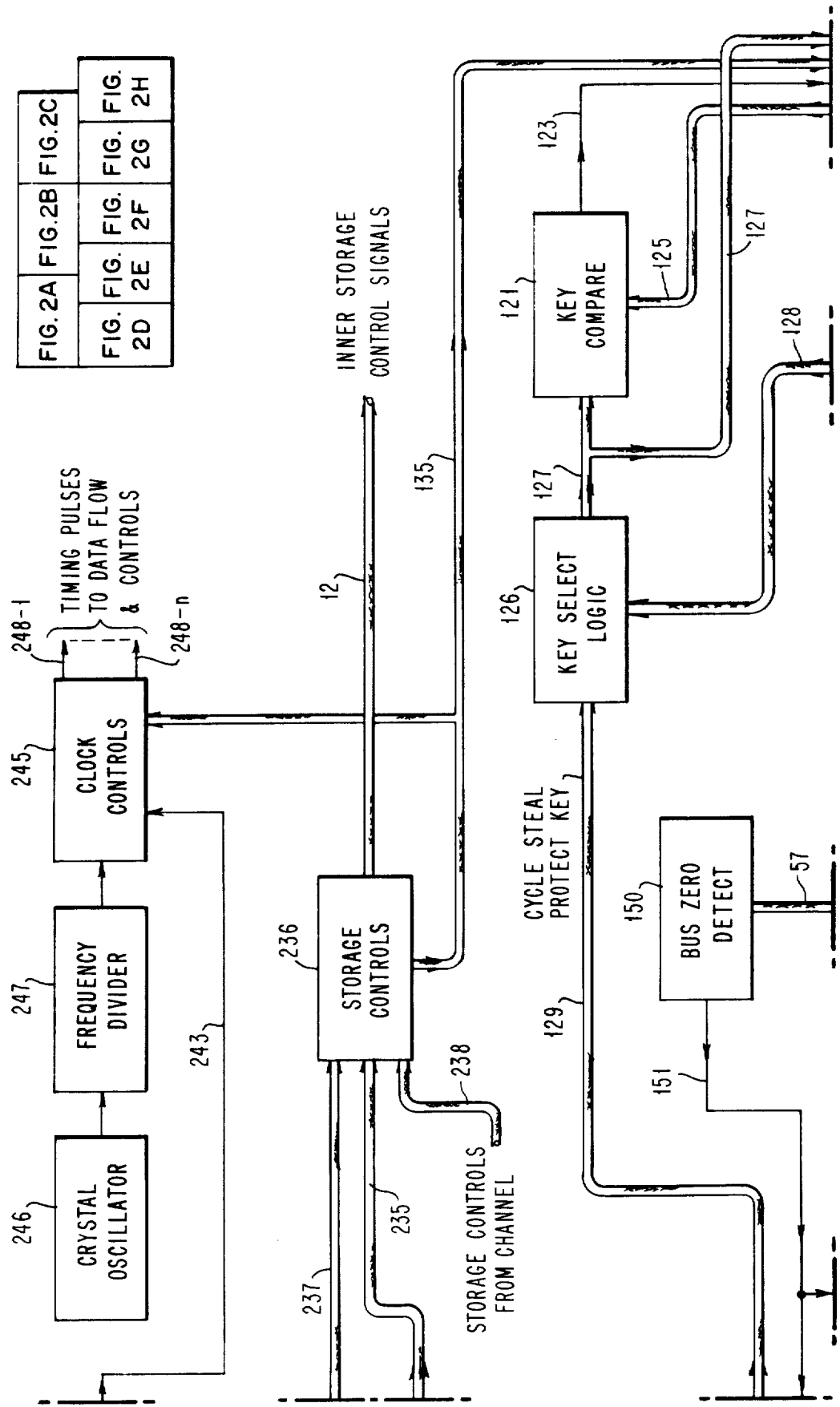

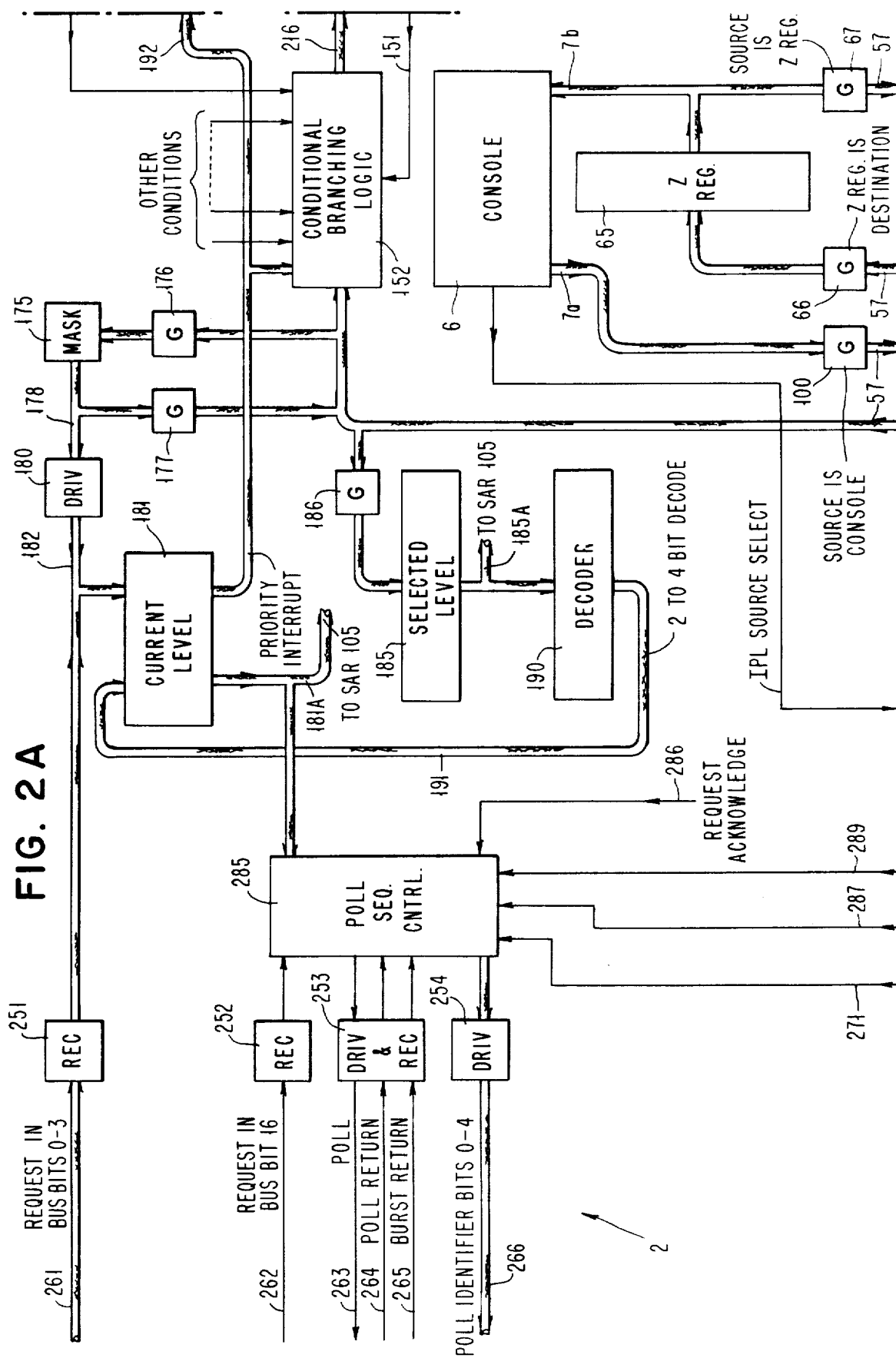

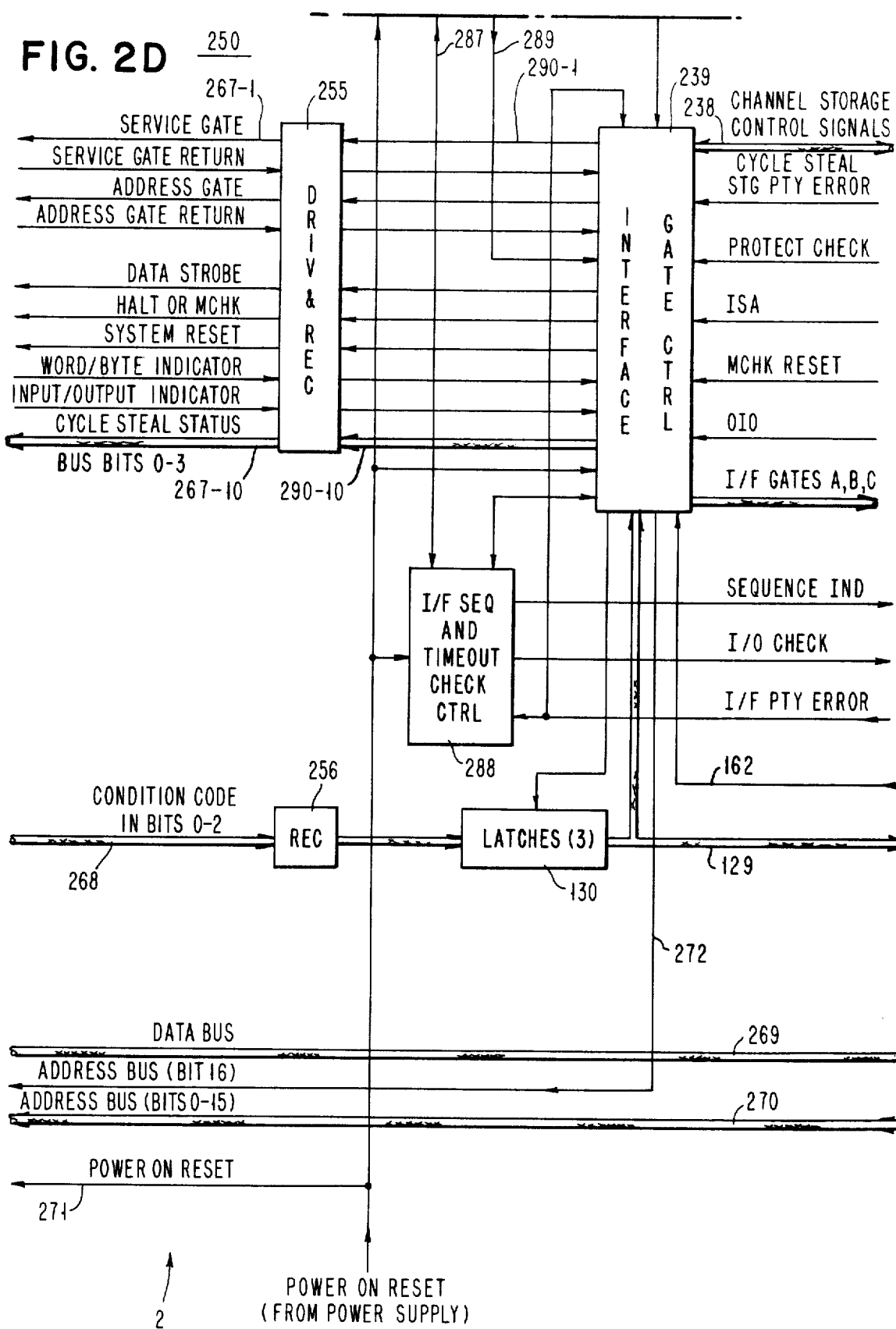

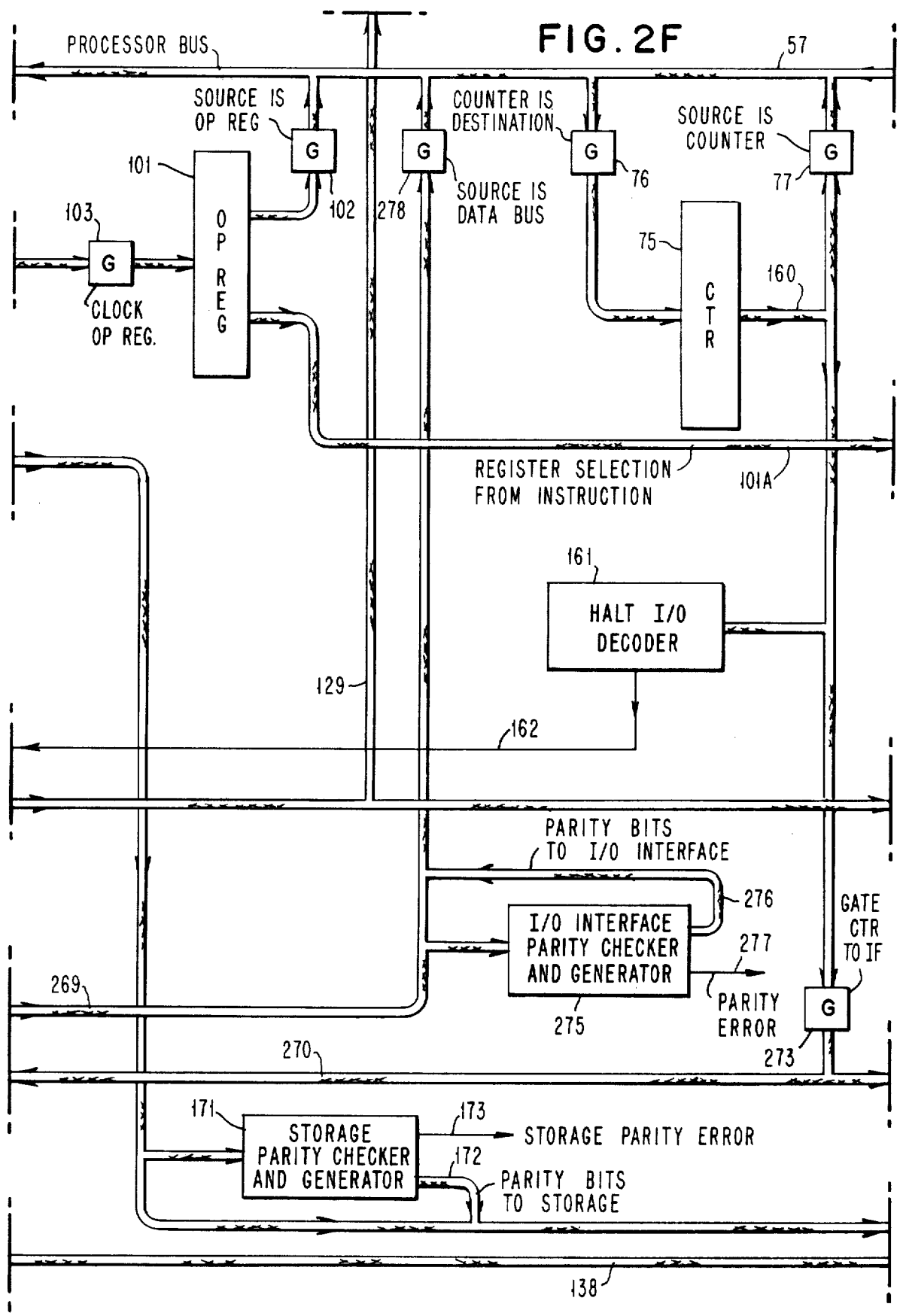

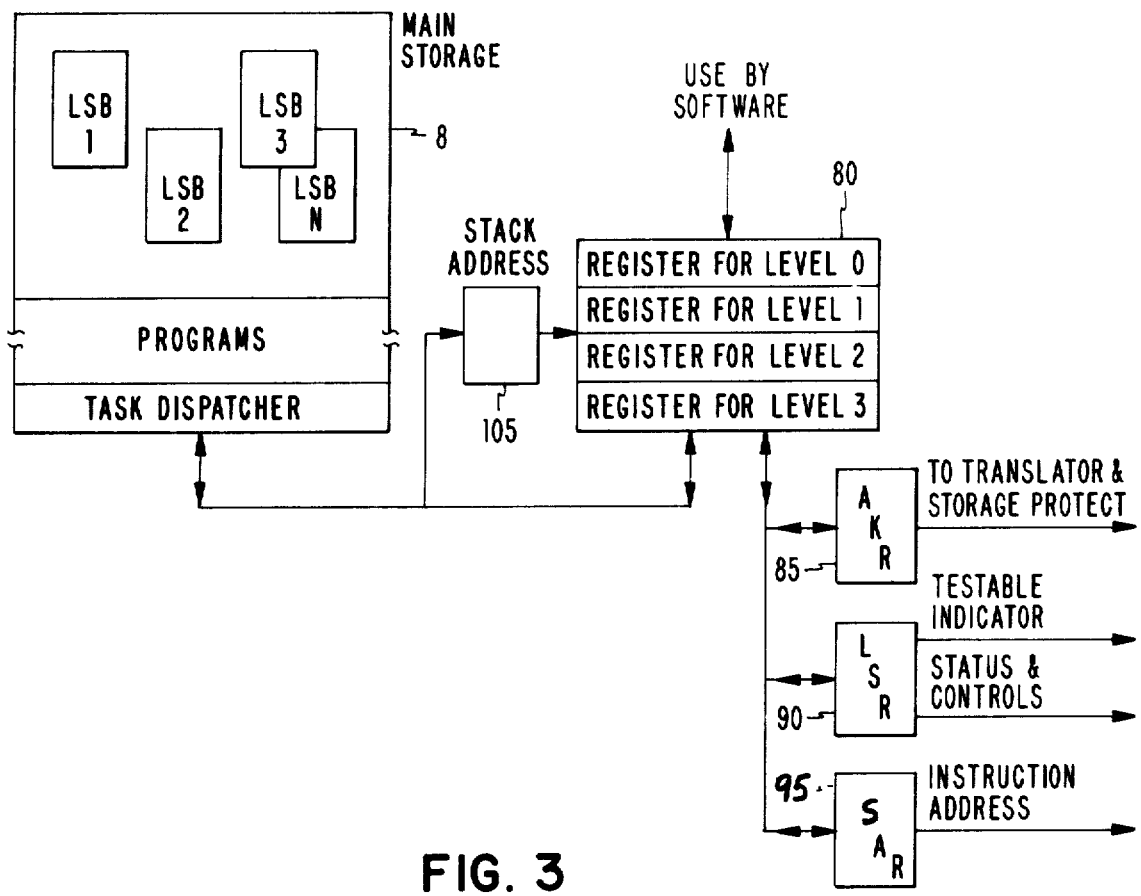

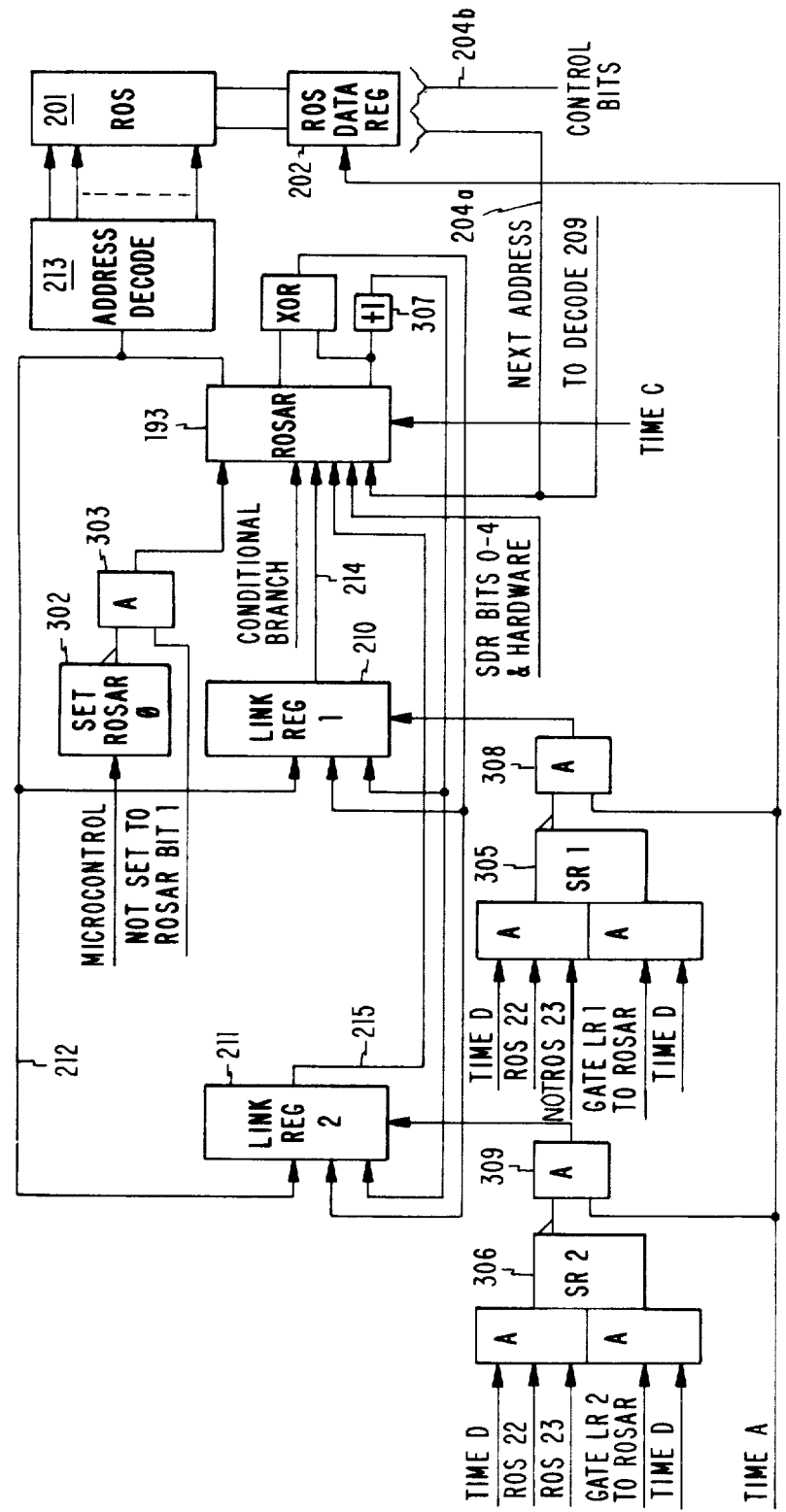
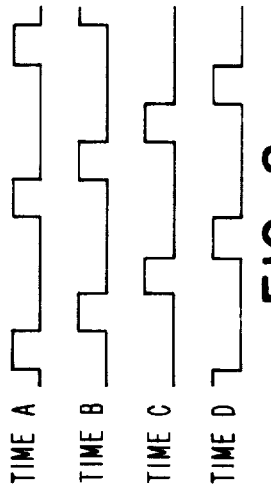
FIG. 6
FIG. 7
FIG. 8

| μ CYCLE NO. | CTL | SOURCE | STG CTL | DEST |
|---|---|---|---|---|
| 1 | C0 | IAR | | WA |
| 2 | | WA+Z | LIW | S&I |
| 3 | | OPD | | Y |
| 4 | | R1 | | WA |
| 5 | CRC0 | WA+Y | | R1 |

ADD IMMEDIATE

ADD IMMEDIATE μCYCLE TIMINGS

TASK MANAGEMENT APPARATUS

RELATED APPLICATIONS

Ser. No. 682,229, filed of even date herewith by M. A. Bouknecht, M. I. Davis and L. P. Vergari entitled "Input/Output Interface Logic for Concurrent Operations," and assigned to the assignee herein, describes and claims the preferred form of the controls associated with the present processor, I/O devices, channel and I/O interface for transferring data to and from the I/O devices and said application is incorporated herein by reference as if it were set forth herein in its entirety.

Ser. No. 681,984, filed of even date herewith by R. E. Birney and M. I. Davis entitled "T Register Controlled Accessing System" and assigned to the assignee herein, describes and claims the preferred form of the addressing controls associated with the present processor and main storage; and said application is incorporated herein by reference as if it were set forth herein in its entirety.

The present application is also related to the following other applications, each of which is incorporated herein by reference as if it were set forth herein in its entirety.

| Serial No. | Title | Inventor(s) |
| --- | --- | --- |
| 681,982 | Address Key Register Load/Store Instruction | R. E. Birney, M. I. Davis, L. A. Graybiel, R. A. Hood, S. Kahn, W. S. Osborne |
| 682,222 | Key Controlled Address Relocation Translation | R. E. Birney, M. I. Davis, R. A. Hood |
| 682,223 | Outer and Asynchronous Storage Extension System | D. G. Bourke, F. J. Puttlitz |
| 682,221 | Equated Operand Address Address Space Control System | R. E. Birney, R. A. Hood |
| 682,224 | Non-Translatable Storage Protection Control System | R. E. Birney, M. I. Davis |
| 681,985 | Supervisor Address Key Control System | R. E. Birney, M. I. Davis, R. A. Hood, T. A. McDermott, L. E. Wise |
| 682,226 | System for Controlling Address Keys Under Interrupt Conditions | R. E. Birney, L. A. Graybiel, W. S. Osborne |
| 682,002 | Data Processing System Featuring Subroutine Linkage Operations Using Hardware Controlled Stacks | M. I. Davis, G. W. Mayes, T. S. McDermott, L. E. Wise |
| 681,983 | Common Polling Logic for Input Output Interrupt or Cycle Steal Data Transfer Requests | M. A. Bouknecht, D. G. Bourke, L. P. Vergari |
| 682,228 | Residual Status Reporting During Chained Cycle Steal Input/Output Operations | D. G. Bourke, L. P. Vergari |
| 682,227 | Translator Lookahead Controls | D. G. Bourke |

BACKGROUND OF THE INVENTION

Hardware facilities are described whereby the processors of task dispatching, preemption, enqueuing and dequeuing may be handled in a manner which is faster, uses less storage and is less prone to error in programming. A task is herein defined as a section of executable code which has been provided with a controlled environment in which to execute. This controlled environment commonly includes a complete set of status associated with the task. This status may include instruction address, register contents, and sundry control information relating to the execution status of the task. It has been common in previous computer systems to have this information grouped together only by software concept. That is to say, the task management software retains in main storage a block of data defining the parameters mentioned above but the hardware does not regard this as a unit of task control; rather individual instructions are provided whereby, for instance, registers may be loaded, the instruction address may be loaded and certain control information may be set up. Since this entire block of information must be changed every time the current task is changed, this process becomes very time consuming. In addition, the large number of instructions required to handle each piece of information separately, lead to the use of large amounts of storage to manage the transfer of information and also allow opportunities for errors in programming.

SUMMARY OF THE INVENTION

The present invention provides, within the hardware architecture of a computer system, the facilities for the hardware to manipulate a block of task-control information, hereinafter referred to as "level status block." The improvement is described in the context of a computer system featuring multiple preemptive priority interrupt levels, each level with its own set of hardware registers and status information such as that shown in U.S. Pat. Nos. 3,825,902 and 3,905,025. However, the improvement applies equally to a computer system which does not feature such priority levels.

In the preferred embodiment, level status blocks normally occupy contiguous areas of main storage and consist of the following parameters:

Word 1 — The status information relating through the task and its execution state (called level status)

Word 2 — Address key register information, containing the names of the address spaces which are assigned to the task Word 3 — The instruction address at which execution of the task is to commence or continue.

Word 4 - 11 — This area contains the contents of the general purpose registers to be used when the task becomes active. The area in main storage contiguously following this section of the level status block may be used for software control. Although not examined by the hardware, it is convenient to describe the task in one contiguous block of storage. The design of the software control content of the level status block is dependent upon design considerations of the programming system which is being used and is not dependent upon the previous words 1-11 of the level status block.

In order to make a given task active upon a given level, an instruction known as load level status block is executed. This instruction computes the effective address of the selected level status block in main storage and loads that block into the hardware of the level selected parametrically by the instruction. The load level status block instruction can also be used to suspend or terminate a task.

The current status of the tasks active on any of the levels in the system may be interrogated and copied into main storage by a store level status block instruction which performs in a manner exactly opposite to that of the load level status block instruction. That is to say, the contents of the hardware registers and status conditions relative to the addressed level are placed into the main storage location starting at the effective address computed from the store level status block instruction.

By appending the software parameters to that set of parameters in the level status block which are used by both the hardware and software, a single register may be used as a base for manipulation of the contents of the entire task.

The contents of the level status word may include the following:

1. Arithmetic and logical result indicators set as a result of certain operations and subsequently used by branching instructions for decisionmaking.
2. A bit indicating the existence of supervisor state. In supervisor state, those instructions which permit manipulation of system resources may be executed. If the bit is a 0, the system is considered to be in problem state and instructions of this type are suppressed.
3. An in process bit indicating that the task is either currently active or has been preempted due to an interrupt of higher priority. The in process bit is used with respect to task switching and dispatching.
4. A trace bit is used where hardware tracing is provided for the current task.
5. The system summary mask bits and other interruption control conditions bits are contained in the level status. Obviously, other functions appropriate to the control of the task in other systems may also be included in the level status. The level status is not specifically restricted to one word in length, nor are the remainder of the fields in the level status block.

The effect on the system of the execution of the load level status block instructions is determined by three factors:

1. The current execution level.
2. The level selected parametrically in the load level status block as the target level.
3. The state of the in process bit contained in the level status block identified by the effective address of the load level status block instruction.

The action of load level status block instruction, when the in process bit is a 1 bit in the level status block identified by the load level status block instruction, is as follows:

1. If the selected level is lower in priority than the current level, the selected level will become pending and its level status will be defined by the level status block that was at the effective address of the load level status block instruction. Provided no priority interrupts are requested on a level higher than the selected level, termination of the current level will cause the selected level to become active.
2. If the selected level is equal to the current level, the selected level will become the current level with its level status defined by the level status block at the effective address specified by the load level status block instruction.
3. If the selected level is higher in priority than the current level, the selected level will become current with its level status defined by the level status block at the effective address specified by the load level status block instruction.

It will be noted that method 1 above permits a low level task to be enqueued and executed when the more important task is terminated. Method 2 allows modification of the current task and Method 3 allows an interruption or preemption to the higher level and causes the old current level to become pending.

The following paragraphs describe the operation when the in process bit in the level status block at the main storage location specified by the effective address contained in the load level status block instruction is a 0:

1. If the selected level is lower in priority than the current level, the selected level will be made nonpending. Its level status is defined by the level status block located at the effective address specified by the load level status block instruction.
2. If the selected level is equal to the current level, the current level will be terminated with its level status defined by the level status block at the effective address specified by the load level status block instruction.
3. If the selected level is higher in priority than the current level, the higher level status is defined by the level status block at the effective address specified by the load level status block instruction.

Case 1 above permits a task to be suspended or terminated with its status either changed as desired or unchanged. Case 2 above permits the same operation to occur on the current level, while Case 3 allows a task to be enqueued upon a higher level but its execution to be delayed until desired.

In the preferred form, the improvement is achieved by means of

Hardware current level register latches, selected level register latches, pending level register latches with suitable interconnections and controls which are operated, under microprogram control, in conjunction with the means for transferring level status blocks between main storage and the hardware level register sets.

It will be appreciated that in a hardware processor (as opposed to a microprogrammed processor) the equivalent controls will be effected in hardware; and it is intended that such equivalent controls are covered by the claims of the present application.

BRIEF DESCRIPTION OF DRAWINGS

In the drawings:

FIG. 3 is a diagramatic illustration of the primary components utilized to achieve the present improvement;

FIG. 4 is a map of the preferred form of the stack registers;

FIG. 6 is a schematic diagram of the read only storage (ROS) controls of the processor illustrated in FIGS. 2A - 2H;

FIG. 7 shows the preferred format of the microprogram instructions;

FIG. 8 shows the basic timing signals for the microprogram execution;

GENERAL DESCRIPTION OF THE SYSTEM

Figure 1:
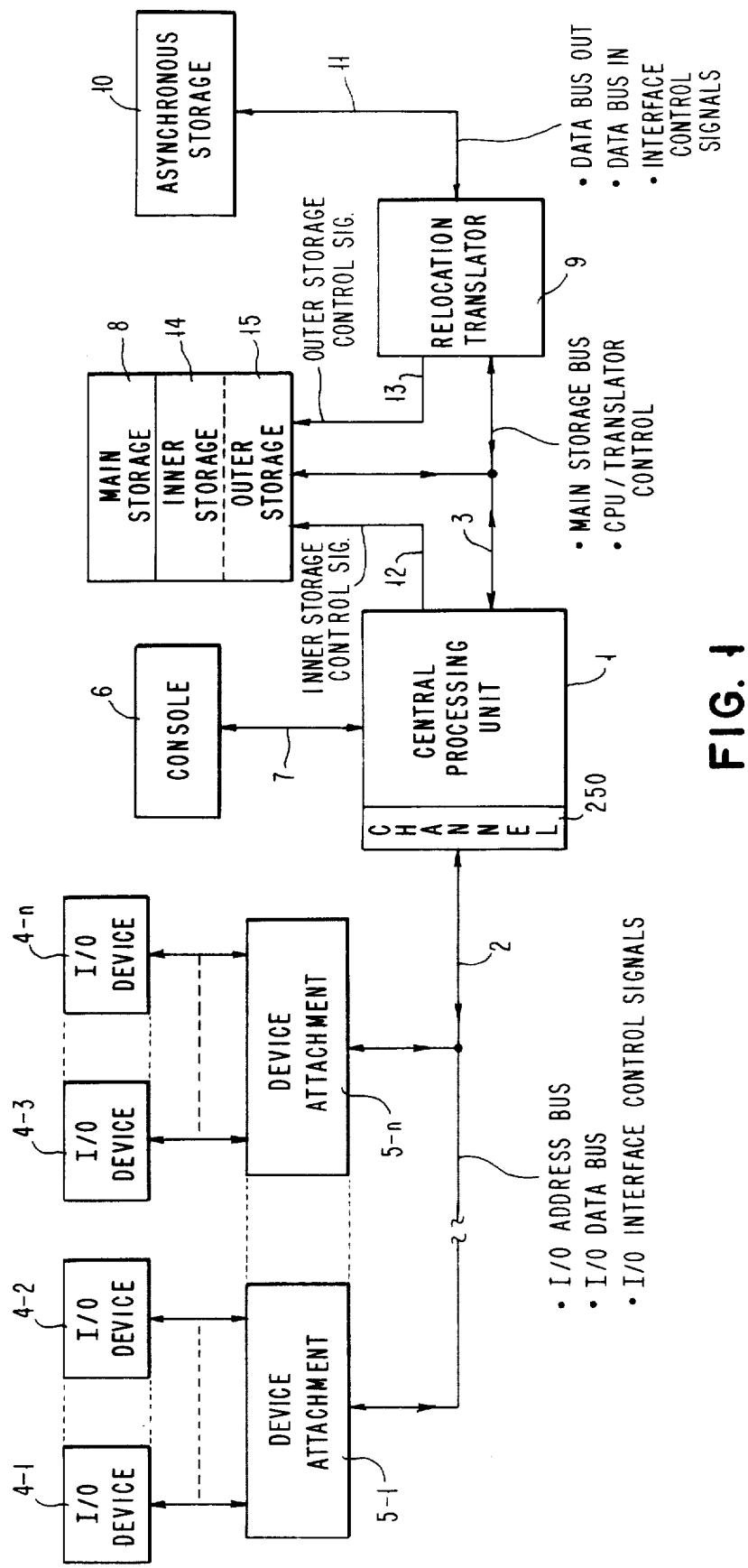
FIG. 1 is a block diagram of a data processing system incorporating the present improvement.

FIG. 1 is an overview block diagram of a preferred system within which the present improvement is incorporated.

The central processing unit (CPU), or processor 1, is the primary element of the system and is shown in more detail in FIG. 2A-2H. It executes instructions and controls activity on the two primary interfaces of the system, the input/output (I/O) Interface 2 and the storage/translator interface 3.

A plurality of input/output (I/O) devices 4-1 to 4-n are coupled to the I/O interface 2 by way of respective device attachments 5-1 to 5-n. The device attachments 5-1 to 5-n, together with the CPU 1, control the transfer of data between the CPU 1 and the I/O devices, 4-1 to 4-n.

The storage translator interface 3 couples the CPU 1 to a main storage 8 and to a relocation translator 9. An interface 11 couples the relocation translator 9 to an asynchronous storage 10. The main storage 8 includes an inner storage section 14 and an outer storage section 15. An interface 12 couples the CPU 1 to the main storage 8 for controlling the transfer of data between the CPU and the inner storage 14. An outer storage interface 13 couples the main storage 8 to the relocation translator 9 for controlling the transfer of data between the CPU 1 and the outer storage 15.

An operator console 6 is coupled to the CPU 1 by way of an interface 7.

The interface 2 includes an I/O address bus, an I/O data bus, and I/O interface control signals which will be described in greater detail with respect to FIG. 2. The interface 3 includes a main storage bus and CPU/translator control signal busses. The interfaces 12 and 13, respectively, provide a path for inner storage control signals and outer storage control signals during data transfers. The interface 11 includes a data bus out and a data bus in, together with interface control signal lines. To the extent that these interfaces are pertinent to the subject matter of the present improvement, they will be described below.

CPU Data Flow (FIGS. 2A – 2H)

The CPU 1 includes an arithmetic and logic unit (ALU) 51 (FIG. 2E) of conventional construction. A pair of input registers are provided for the ALU 51, i.e. the WA register 52 and the Y register 53, which registers are coupled to the ALU 51 by way of buses 54 and 55, respectively. The ALU 51 includes an output bus 56 which is coupled to the processor bus 57 by way of an AND gate 58. The processor bus 57 is coupled to the registers 52 and 53 by way of AND gates 60 and 61 to provide input data to the ALU 51.

The processor bus 57 acts as the main data bus for both source and destination data. Therefore, each of the functional components of the processor, which acts as the source, is coupled to the processor bus 57 by way of an AND gate; and each functional component of the CPU 1, which acts as a destination, is coupled to the processor bus by way of a respective AND gate. Most of the functional components of the system act as both a source and a destination for data; and, therefore, are coupled to the processor bus 57 by both source AND gates and destination AND gates.

Thus, the processor bus 57 is coupled to a Z register 65 by way of a destination AND gate 66 and a source gate 67, to a processor storage data register 70 by way of a destination AND gate 71 and a source AND gate 72, to a counter 75 by way of a destination AND gate 76 and source AND gate 77, to a register stack 80 by way of a destination AND gate 81 and a source AND gate 82, to an address key register 85 by way of a destination AND gate 86 and a source AND gate 87 to a hardware level status register 90 by way of a destination AND gate 91 and a source AND gate 92, and to a processor storage address register 95 by way of a destination AND gate 96 and a source AND gate 97.

The processor bus 57 is coupled to the console 6 (FIG. 2A) by way of a source AND gate 100 and interface bus 7a. Data is directed from the processor bus 57 to the console 6 way way of the AND gate 66, the Z register 65, and the interface bus 76. An operation (O) register 101 (FIG. 2F) is coupled to the processor bus 57 by way of a source AND gate 102. Operation codes are stored into the OP Reg. 101 from the processor storage data register 70 by way of an AND gate 103. A stack address register 105 (FIG. 2G) is coupled to the processor bus 57 by way of a destination AND gate 106. A current instruction address register 107 is coupled to the processor bus 57 by way of a source AND gate 109. The input of the register 107 is coupled to the output of the stack registers 80 by way of a bus 108. A storage protect array 110 (FIG. 2H) is coupled to the processor bus 57 by destination and source AND gate 111 and 112.

A program status word (PSW) register 115 has its output 116 coupled to the processor storage bus 57 by a source AND gate 117. Inputs to the register 115 are provided from various system check input lines 120, from a key compare register 121 and from a storage check condition bus 136.

Inputs to the key compare register 121 are provided by the storage protect array register 110 by way of the output bus 125 of array 110 and from a key select logic circuit 126 by way of a bus 127. The output 128 from the register 85 is coupled to one input of the circuit 126. The second input 129 to the circuit 126 is provided by cycle steal protect latches 130 (FIG. 2D). The input bus 129 from the latches 130 is also coupled to the register 90. The output 127 of the key select logic circuit 126 is also coupled to the main storage 8 and relocation translator 9 by way of the output bus 127 which forms a part of the storage/translator interface 3.

The interface 3 also includes a synchronization bus 135 (FIG. 2H), the check condition bus 136, an address bus 137, and input and output buses 138 and 139. The output 140 of the processor storage address register 95 is coupled to the address bus 137 by way of an AND gate 141. The cycle steal storage address register 142 has its output 143 coupled to the address bus 137 by way of an AND gate 144.

A zero detect circuit 150 (FIG. 2C) has its input coupled to the processor bus 57 and its output 151 coupled to a conditional branching logic circuit 152 (FIG. 2A). The output 151 of the zero detect circuit 150 is also coupled to the input of a result indicator circuit 153

Figure 2B:
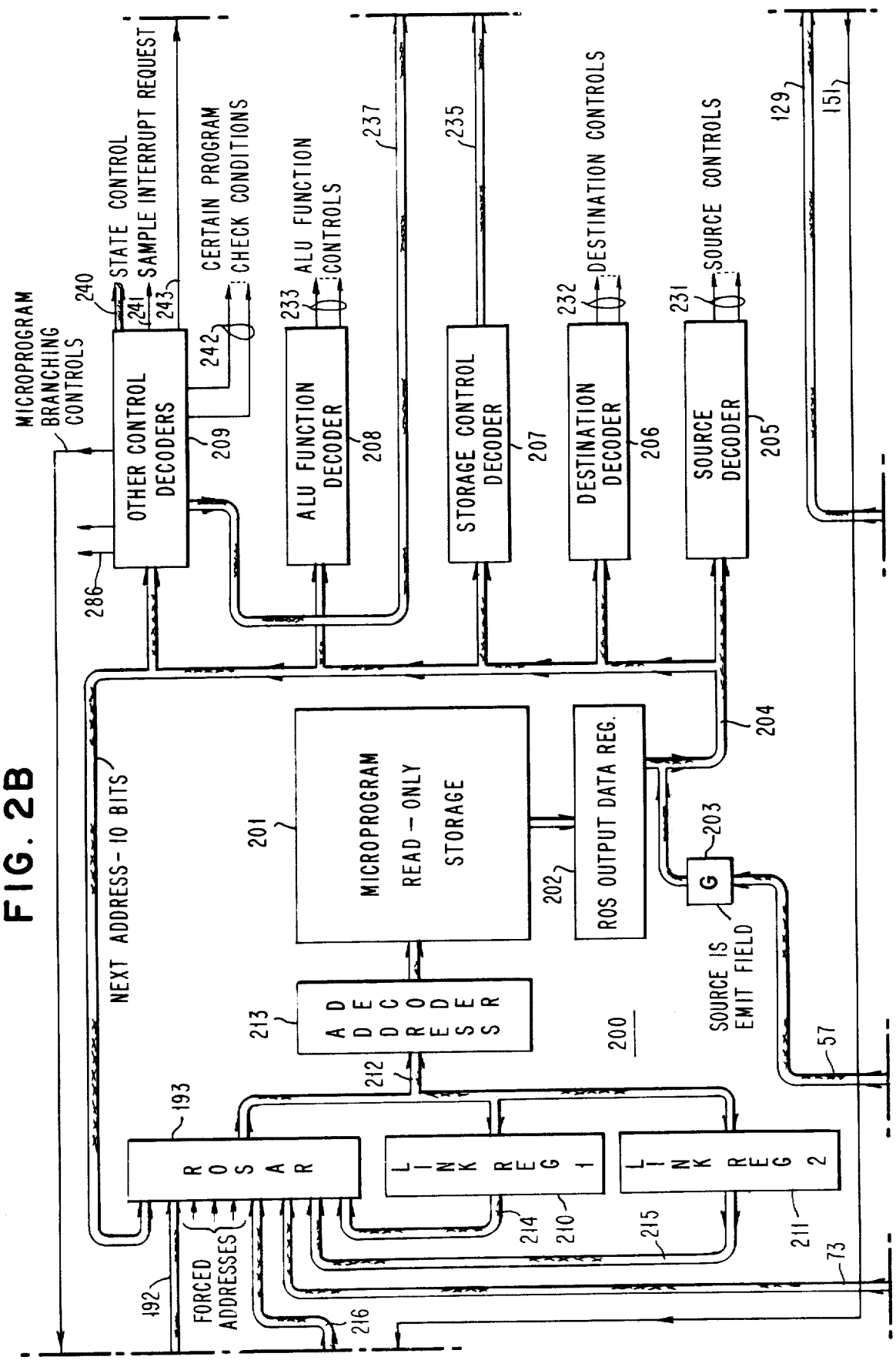
FIG. 2 shows the organization of FIGS. 2A - 2H which latter figures illustrate the major components and data flow of the preferred form of a processor incorporating the present improvement.
Figure 2E:
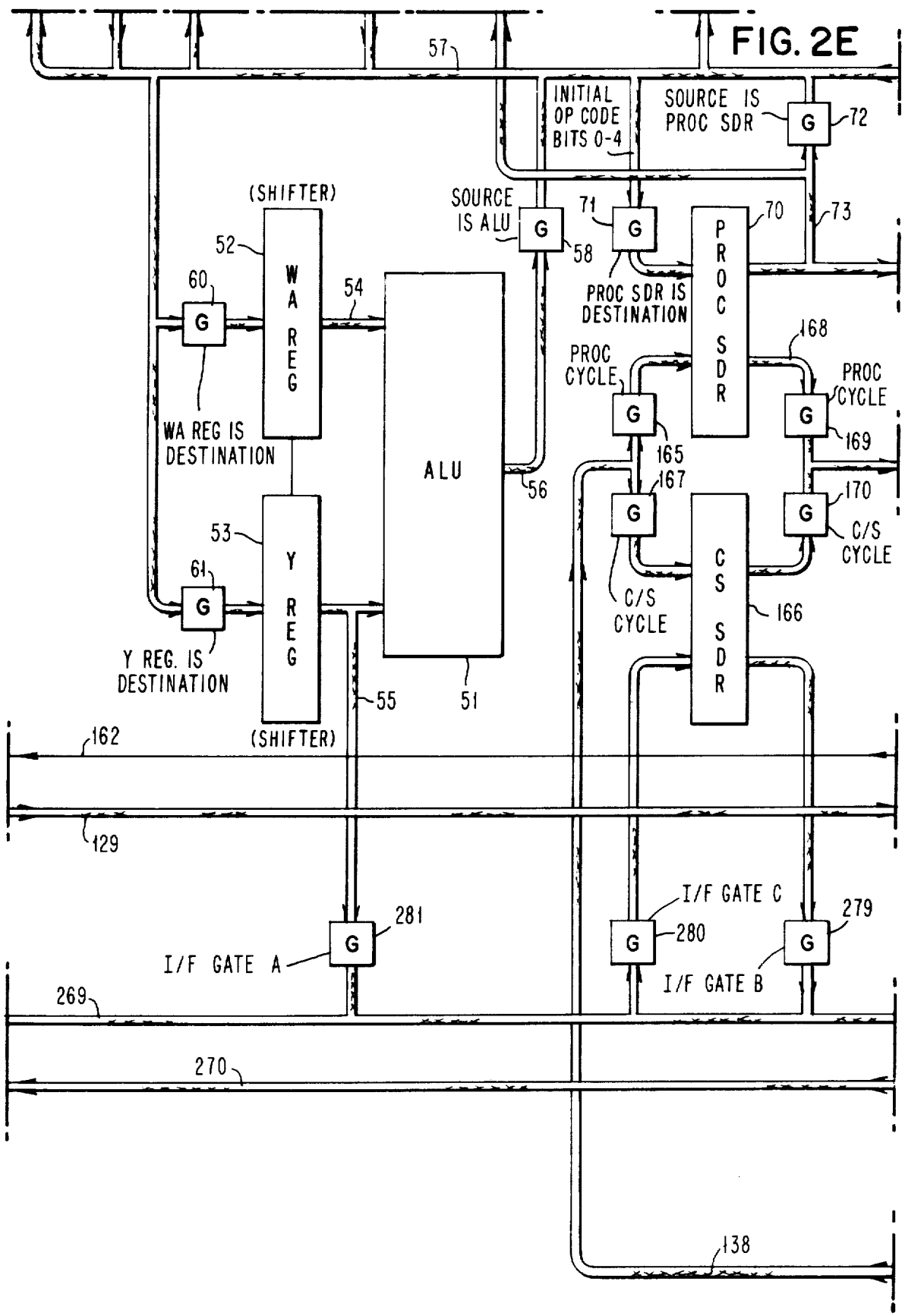
Figure 2G:
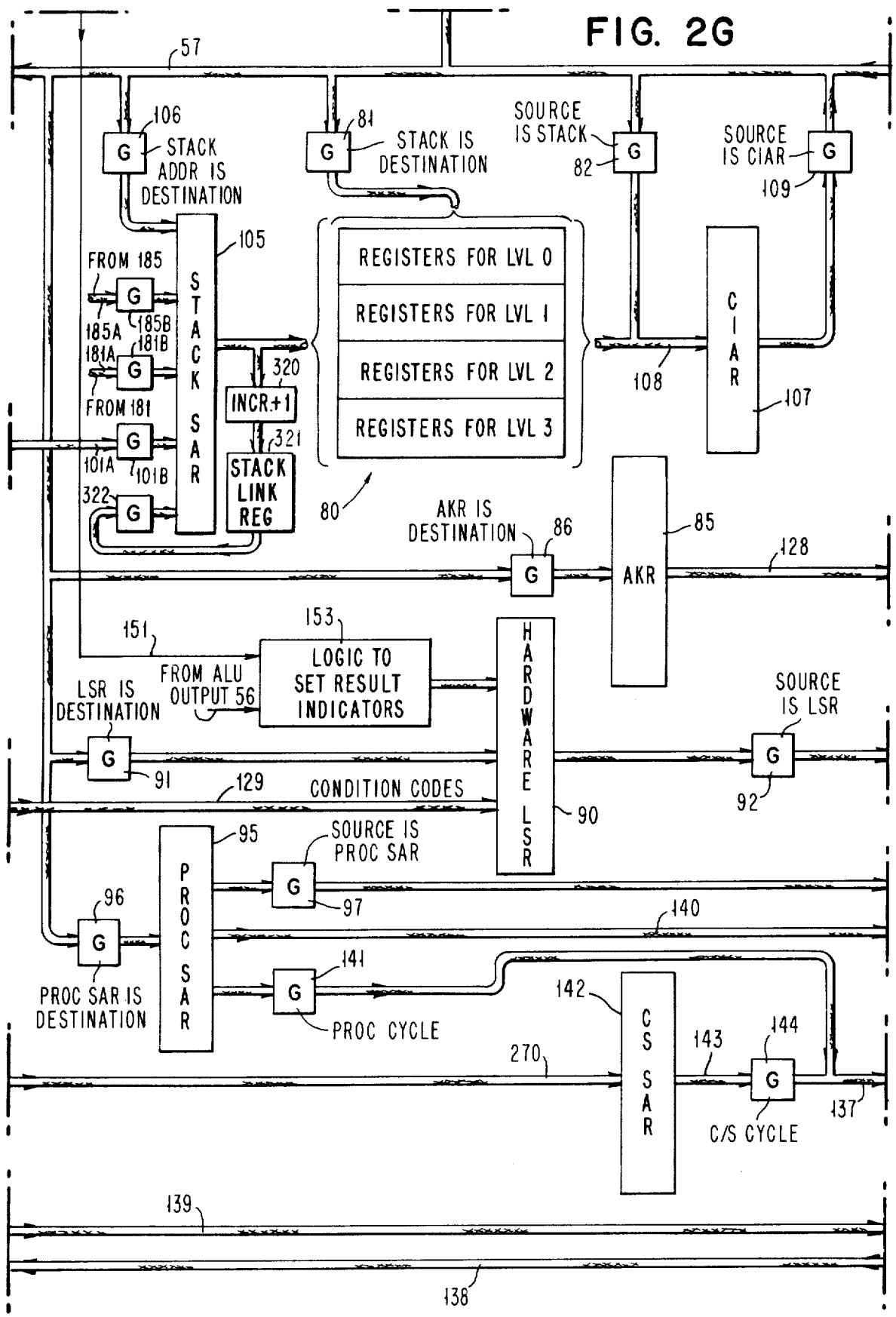
Figure 2H:
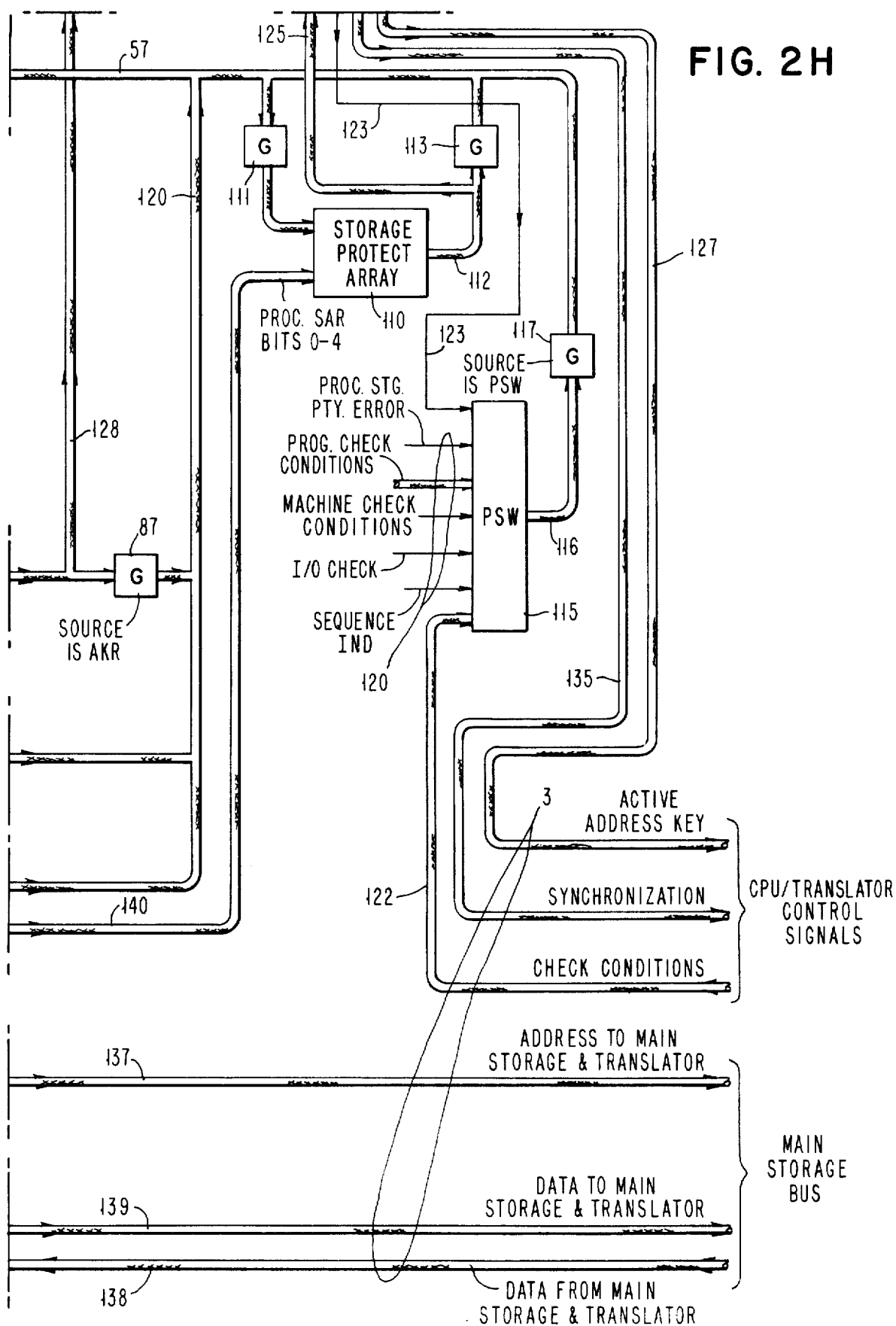

(FIG. 2G). A second input 154 to the result indicator circuit 153 is derived from the output of the ALU 51.

The processor bus 57 also forms an input to the conditional branching logic circuit 152.

The output 160 of the circuit 75 (FIG. 2F) provides inputs to a Halt I/O decoder 161 and to the cycle steal storage addresses register 142. The output 162 of the decoder 161 is coupled to an interface gate control circuit 239 (FIG. 2D). The input data bus 138 from main storage is coupled to the processor storage data register 70 (FIG. 2E) by way of an AND gate 165 and to a cycle steal storage data register 166 by way of an AND gate 167. The output 168 from the processor storage data register 70 is coupled to the output data bus 139 to main store by way of an AND gate 169. The register 166 is coupled to the bus 139 by way of an AND gate 170. The outputs of register 70 and 166 are also coupled to a storage parity check 171 (FIG. 2F). The circuit 171 provides parity bits to the output data bus 139 when no parity error exists and provides an output signal on line 173 when a storage parity error is detected.

A mask register 175 (FIG. 2A) is coupled to the processor bus 57, bits 12, 13, by way of input and output gates 176, 177. The output 178 of the mask register 175 is also coupled to a current level register by way of driver circuits 180 and a bus 182a.

A selected level register 185 is coupled to the processor bus 57, buts 14, 15, by way of an input. An output 185a of register 185 is coupled to the stack SAR 105 (FIG. 2G) by way of a gate 185b. The output 185a is also coupled to the current level register 181 by way of decoder circuits 190 and the output 191 of the decoder circuits 190. The output 192 of the current level register 181 is coupled to the Read Only Storage Address Register (ROSAR) 193 (FIG. 2B) of a microprogram control mechanism 200 of the CPU 1. The output 181a of the register 181 is coupled to the stack SAR 105 by way of gate 181b after being encoded from four to two bits by encoder 181c.

The microprogram control mechanism 200 includes a Read Only Storage (ROS) 201, which is coupled to the processor bus 57 by way of the ROS output data register 202 and source AND gate 203. A second output 204 of the ROS output data register 202 is coupled to a source decoder logic circuit 205, a destination decoder logic circuit 206, a storage control decoder logic circuit 207, an ALU function decoder logic circuit 208, other control decoder logic circuits 209, and the ROSAR 193.

Address selection for the ROS 201 is provided from the ROSAR 193 via bus 212 and an address decoder logic circuit 213. A link register 1 210 and a link register 2 211 have their inputs coupled to ROS 193 via bus 212 and have their outputs 214, 215. The processor storage data register 70 (FIG. 2E) provides another input to ROSAR 193 via bus 73. The conditional branching logic 152 provides an input to ROSAR 193 via bus 216.

The source decoder circuits 205 includes output source control lines 231, which are utilized to control the various source AND gates (such as gate 102) to access source data. The destination decoders 206 include output destination control lines 232, which control various destination AND gates (such as gate 76) to direct destination data to the proper registers or other components. The ALU function decoder circuits 208 include output ALU function control lines 233, which are utilized to control the various functions of the ALU during processor cycles. These destination controls, source controls and ALU function controls will be described in greater detail below, insofar as they are related to the improvement of the present application.

The storage control decoder logic circuits 207 have an output 235 coupled to a storage control circuit 236. The circuit 236 includes a second input 237 derived from the decoder circuits 209 and a third input 238 from the channel interface gate control circuits 239 (FIG. 2D). This bus 238 is bidirectional and is utilized during data transfers between the I/O devices 4-1 to 4-10 and the CPU 1. The interface bus 12 and the synchronization bus 135 are both coupled to the storage controls logic circuit 236.

The decoder circuits 209 have a state control output 240, a sample interrupt request output 241, and a check condition output 242. In addition an output 243 from the decoder circuits 209 is coupled to a clock controls circuit 245 (FIG. 2C). A crystal oscillator 246 provides signals to a frequency divider 247 which in turn is coupled to the input of the clock controls circuit 245 to provide the timing pulses for the data flow and controls of the CPU 1. These timing pulses to the CPU data flow and controls are provided by way of output lines 248-1 - 248-N of the clock controls circuit 245. The synchronization bus 135 is coupled to the clock control circuit 245 and is a two-way communications bus for this purpose.

The channel hardware 250 (FIGS. 2A, 2D) will now be described in detail. The channel hardware 250 includes a plurality of driver and receiver circuits 251 to 256, inclusive, which are coupled to the various lines and buses of the I/O interface 2. Thus, the receiver 251 is coupled to a request in bus 261, bits 0–3. The receiver 252 is connected to a request in bus 262, bit 16. A group of receiver and driver circuits 253 are connected to the poll line 263, the poll return line 264 and the burst return line 265. The driver circuit 254 is coupled to the poll identifier bus 266, bits 0–4. The driver and receiver circuits 255 are coupled to lines 267-1 to 267-10, inclusive, which are the service gate line, the service gate return line, address gate line, address gate return line, data strobe line, hold or machine check line, system reset line, word/byte indicator line, input/output indicator line, and cycle steal status bus, bits 0–3, respectively. The receivers 256 are connected to a condition code input bus 268, bits 0–2. The interface 2 also includes a date bus 269, an address bus 270, bits 0–15, an address bus bit 16 line 272 and a power on reset line 271.

The data bus 269 is coupled to the input of an I/O interface parity checker and generator circuit 275. The circuit 275 includes a first output 276 which provides parity bits to the I/O interface data bus 269 when no error exists in data transmitted from an I/O device into the CPU 1. The circuit 275 includes a second output 277 which provides a signal when a parity error occurs on the data bus 269. The data bus 269 is also coupled to the processor bus 57 by way of a source AND gate 278. The data bus 269 is coupled to the input of the cycle steal storage data register 166 by way of an AND gate 280 and is coupled to the output of the cycle steal storage data register 166 by way of an AND gate 279. The data bus 269 is coupled to the output 55 of the Y register 53 by way of an AND gate 281.

The address bus 270 is coupled to the input of the cycle steal storage address register 142. The address bus 270 is also coupled to the output 160 of the counter 75 by way of a gate 273.

The output 182b of receiver circuits 251 is coupled to an input of the current level register 181 via AND gate 187c, the other input of which is the mask driver output 182a. The driver and receiver circuits 252, 253, 254 are coupled to a poll sequence control circuit 285. The current level register 181 provides another input to the circuit 285 via output 181a. A request acknowledge line 286 provides a further input to the poll sequence control circuit 285. The poll sequence control circuit 285 is also coupled to the interface gate control circuit 239 by way of a line 289. An interface sequence ad timeout check control circuit 288 is coupled to the poll sequence control circuit 285 by way of a line 287. The power on reset line 271 provides an additional input to the circuit 285.

Lines 290-1 to 290-10 couple the driver and receiver circuits 255 to the interface gate control circuit 239.

The processor bus 57 is a 16 bit wide bus for conveying information between source and destination elements in the CPU data flow as selected by the microprogram controls.

The operation register (OP REG) 101 is a 16 bit register which contains the first word of the instruction, including register address arguments for the register stack 80, during instruction decode. It is also used as a temporary data register when not holding the first work of the instruction. Its output is a source element to the processor bus 57. It receives its input from the storage data register 70.

The ALU 51 is a 16 bit element which performs arithmetic and logical functions as specified by the instructions. Its output 56 is a source element to the processor bus 57. It receives its input from the WA and the Y registers 52, 53.

The WA register 52 is a 16 bit register which is the primary input to the ALU 51 for arithmetic and logic operations. It receives input as a destination element from the processor bus 57.

The Y register 53 is a 16 bit register which is the secondary input to the ALU 51 for arithmetic and logic operations. In conjunction with the WA register 52, it performs shifting on double word shift operations. It receives input as a destination element from the processor bus 57. This register 53 also provides the data path for outbound data to the I/O data bus 269 for direct program control I/O operations.

The processor storage data register (PROC SDR) 70 is a 16 bit register through which all data to or from main storage, except cycle stealing data, is gated. The first word of every instruction that is fetched from main storage 8 is gated through the PROC SDR register 70 to the OP register 101. This register 70 is also used as a temporary data register during other processor operations. Therefore, it can receive input as a destination element from the processor bus 57 and outputs as a source element to the processor bus 57.

The cycle steal storage data register (CS SDR) 166 is a 16 bit register through which all data is gated to and from main storage 8 via the I/O data bus 269 and either the in or out storage bus 138 or 139 during cycle steal operations.

The low order 8 bits of the 16 bit counter (CTR) 75 are used as a counter for keeping track of various processor operations. It is also used as a temporary register for other processor operations. Therefore, it is a source and destination element for the processor bus 57. It is also used to hold the device address for device selection and the I/O command is gated via gate 273 to the I/O address bus 270 during direct program control operations.

The processor storage address register (PROC SAR) 95 is a 16 bit register used primarily to hold a main storage address. Its contents are gated via gate 141 to the storage address bus 137 storage accesses during normal processing and direct program control operations. It is also used as a temporary data register when not needed for addressing main storage.

The cycle steal storage address register (CS SAR) 142 is a 16 bit register used to hold a main stroage address transferred via the I/O address bus 270 from the I/O device during cycle steal data transfer operations. It is gated via gate 144 to the storage address bus 137 for cycle steal storage accesses only.

The primary purpose of the 16 bit Z register 65 is to hold the data for the operator data display indicators (not shown) of the console 6. It is also used as a temporary register for other processor operations. It is a source and destination element for the processor bus 57.

The register array (stack) 80 (FIG. 3) is an array of monolithic latches used to hold the registers, level status, address keys and instruction address for each of the four interrupt levels. It also contains certain working registers used by the microprogram, i.e., the TEMP, TEMP1-3, DBUF, SOA1, SOA2, current level save and AKR save, organized as shown in FIG. 3.

The TEMP and TEMP1-3 registers contain temporary data used by the microprogram during normal processing. SOA1 contains the manually entered address to be used for stop-on-address operations and SOA2 contains the console storage key in the low three bits, the remaining bits are zero. The DBUF register is the console data buffer. The contents of this buffer drives the data display indicators (not shown) on the console 6. The current level register contains the level that was active when stop state was entered. The AKR save register contains a copy of the current level AKR.

The data in the LSR, AKR and IAR registers of the stack 80 for the current level are also held in the corresponding hardware registers 90, 85, 107 for performance reasons, i.e., to reduce the number of stack accesses. The stack 80 of the preferred embodiment is comprised of two 64 ×9 arrays connected in parallel to form a 64×18 array.

The stack address register 105 is a six bit register for addressing the stack 80. Inputs to register 105 are provided from an incrementer 320 via a stack link register 321 and a destination gate 322, the selected level register 185 via bus 185a and gate 185b, the current level register 181 via bus 181a and gate 181b, from the OP register 101 via bus 101a and gate 101b, and the processor bus 57. The stack address register 105 is loaded from the processor bus 57 via gate 106.

The hardware level status register (LSR) 90 is a 16 bit hardware register used to hold the current level status. During processing on a specific level, the contents of the hardware register LSR 90 change as the result of arithmetic and logical operations. The current level LSR in the register stack 80 remains unchanged until a level exit occurs. At this time, the hardward LSR register 90 contents are placed into the LSR register in the register stack 80 of the level being exited; and the new level status from the register stack 80 is placed into the hardware LSR register 90.

Certain of the contents of the LSR register 90 are as follows:

TABLE 1

Level Status Register

| Bit | Meaning | |
|---|---|---|
| 0 | Even Indicator | |
| 1 | Carry Indicator | |
| 2 | Overflow Indicator | Result Indicators |
| 3 | Negative Result Indicator | |
| 4 | Zero Result Indicator | |
| 8 | Supervisor State | |
| 9 | In Process | State Controls |
| 10 | Trace | |
| 11 | Summary Mask | |

The result indicators are used by software for decision-making.

The even, carry, and overflow indicators are also used by I/O operations to hold the condition codes sent to the processor 1 by the I/O devices 4-1 to 4-n.

During an I/O instruction execution the even, carry and overflow indicators are assigned the following condition code values:

TABLE 2

| Condition Code | Even | Carry | Overflow | Meaning |
|---|---|---|---|---|
| 0 | 0 | 0 | 0 | Device Not Attached |
| 1 | 0 | 0 | 1 | Busy |
| 2 | 0 | 1 | 0 | Busy After Reset |
| 3 | 0 | 1 | 1 | Command Reject |
| 4 | 1 | 0 | 0 | Intervention Required |
| 5 | 1 | 0 | 1 | Interface Data Check |
| 6 | 1 | 1 | 0 | Controller Busy |
| 7 | 1 | 1 | 1 | Satisfactory |

During interrupt acceptance all condition codes are reported by the device. The even, carry and overflow indicators are assigned the following condition code values:

TABLE 3

| Condition Code | Even | Carry | Overflow | Meaning |
|---|---|---|---|---|
| 0 | 0 | 0 | 0 | Controller End |
| 1 | 0 | 0 | 1 | PCI |
| 2 | 0 | 1 | 0 | Exception |
| 3 | 0 | 1 | 1 | Device End |
| 4 | 1 | 0 | 0 | Attention |
| 5 | 1 | 0 | 1 | Attention and PCI |
| 6 | 1 | 1 | 0 | Attention and Exception |
| 7 | 1 | 1 | 1 | Attention and Device End | where PCI is a program controlled interrupt.

TABLE 4

Level Status Register Bit Definitions

| Bit | | |
|---|---|---|
| 0 Even Indicator | | Set to one if the low order bit of the result is zero; otherwise set to zero. |
| 1 Carry Indicator | | Set to one if the result of add or subtract operations cannot be represented as an unsigned number; otherwise set to zero. |
| 2 Overflow Indicator | | Set to one if the result of an arithmetic operation cannot be represented as a signed number; otherwise set to zero. |
| 3 Negative Indicator | | Set to one if bit 0 of the result is one; otherwise set to zero. |
| 4 Zero Indicator | | Set to one if the result is all zeros; otherwise set to zero. |
| 8 Supervisor State | | Set to one whenever the processor 1 enters supervisor state. Supervisor state is entered when:<br>- A supervisor call instruction is executed.<br>- A class interrupt occurs.<br>- An I/O interrupt is accepted. |

TABLE 4-continued

Level Status Register Bit Definitions

| Bit | |
|---|---|
| 9 In Process | This bit is set or reset by the corresponding bit in the LSR of the storage level status block (LSB) whenever the load level status block (LLSB) instruction is executed. The LLSB loads an LSB from storage 8 into designated level LSB in the stack 80. |
| 10 Trace | This bit is set or reset by the corresponding bit in the LSR register of the storage LSB whenever the local level status block instruction is executed. The LLSB loads an LSB from storage 8 into the designated level LSB in the stack 80. |
| 11 Summary Mask | When the summary mask = 0, all priority interrupts on all levels are disabled. When the summary mask = 1, all priority interrupts on all levels are enabled. The summary mask is set to one (enabled) by the following:<br>- Execution of the enable instruction with bit 15 = 1.<br>- System Reset, Power-On Reset, IPL.<br>- Execution of an LLSB instruction with bit 11 of the storage LSR = 1.<br>- Acceptance of a priority interrupt on the interrupted to level.<br>The summary mask is set to zero (disabled) by the following:<br>- Execution of the supervisor call (SVC) instruction.<br>- Execution of the disable instruction with bit 15 = 1.<br>- Any class interrupt:<br>    Machine Check<br>    Program Check<br>    Soft Exception Trap<br>    Power Thermal Warning<br>    Supervisor Call<br>    Trace<br>    Console<br>- Execution of the LLSB instruction with bit 11 of the storage LSR = 0. |

The processor 1 does not regard numbers as either signed or unsigned, but performs the designated operation on the values presented. All indicators reflect the result of the operation. This allows the programmer to test results for the type of operation performed.

The processor status word (PSW) register 115 is a 16 bit register which contains error and exception information that causes a program check, machine check, soft exception trap, or power thermal warning class interrupt to occur. Three status flags are also contained in the PSW register 115. The PSW register 115 is set by hardware and microprogram-detected conditions.

TABLE 5

| | Processor Bit | Status Word Meaning |
|---|---|---|
| | 0 | Specification Check |
| | 1 | Invalid Storage Address |
| Program Check | 2 | Privilege Violate |
| | 3 | Protect Check |
| | 4 | Invalid Function (either program check or soft exception) |
| | 5 | Floating Point Exception |
| Soft Exception Trap | 6 | Stack Exception |
| | 7 | Reserved |
| | 8 | Storage Parity Check |
| Machine Check | 9 | Reserved |
| | 10 | CPU Control Check |
| | 11 | I/O Check |
| | 12 | Sequence Indicator |
| Status Flags | 13 | Auto IPL |
| | 4 | Translator Enabled |
| Power/Thermal | 15 | Power/Thermal Warning |

The address key register (AKR) 85 (FIG. 2G) is a sixteen bit hardware register used to contain the contents of the current level AKR during processing on that particular level. The AKR register 85 provides the address key which is compared in circuit 121 against the protect key in the storage protect array 110. This is done for each storage access except for cycle steal operations. The instruction space key (ISK) field of the AKR is also used as the console address key for any manual storage accesses from the console 6.

TABLE 6

| Address Key Register | |
|---|---|
| Bit | Meaning |
| 0 | Equate Operand Spaces |
| 5 | Operand 1 Key bit 0 |
| 6 | Operand 1 Key bit 1 |
| 7 | Operand 1 Key bit 2 |
| 9 | Operand 2 Key bit 0 |
| 10 | Operand 2 Key bit 1 |
| 11 | Operand 2 Key bit 2 |
| 13 | Instruction Space Key bit 0 |
| 14 | Instruction Space Key bit 1 |
| 15 | Instruction Space Key bit 2 |

The current instruction address register (CIAR) 107 (FIG. 2G) contains the address of the instruction being executed. The CIAR register 107 is loaded at the beginning of each instruction. During the execution of the instruction, the level IAR in stack 80 is updated to the next instruction address. Should a class interrupt stop the current instruction from being fully executed, the class interrupt is handled, then the CIAR register 107 is used to readdress the interrupted instruction which is executed again.

The storage protect array 110 (FIG. 2G) consists of the thirty-two storage key registers (not shown). The array is enabled whenever the storage protect feature is installed and enabled. Each register contains the protect key and the read only bit for controlling a two thousand forty-eight byte block of storage 8. The set storage key instruction sets the key and read only bit into a specific storage key register. The copy storage key instruction reads out a specific storage key register.

The current level register 185 (FIG. 2A) consists of a 2 bit register which is used to hold the current level indicator that is presently in effect. The register 185 is set whenever the level is changed. The register 185 is used in addressing the proper level status block in the local storage stack 80 and is also used to determine if an interrupt may be accepted. For this latter purpose, a two to four bit level decoder 190 is used. The register 185 is a source and destination element for the processor bus 57.

The mask register 175 (FIG. 2A) is a four bit register which is used to enable to disable priority interruptions on the four interrupt levels, as follows:

TABLE 8

| Bit 0 = 0 Level 0 | Interruptions disabled |
|---|---|
| Bit 1 = 0 Level 1 | Interruptions disabled |
| Bit 2 = 0 Level 2 | Interruptions disabled |
| Bit 3 = 0 Level 3 | Interruptions disabled |
| Bit 0 = 1 Level 0 | Interruptions enabled |
| Bit 1 = 1 Level 1 | Interruptions enabled |
| Bit 2 = 1 Level 2 | Interruptions enabled |
| Bit 3 = 1 Level 3 | Interruptions enabled |

The mask register 175 is set by the load mask instruction. It is a source and destination element for the processor bus 57.

The mask register outputs 178 are also connected to the mask unloaded drivers 180 which permits the AND-ing of the four bits of mask register 175 with the appropriate priority interrupt request bits from the I/O interface receivers 251 and bus 261 for use in establishing interrupt acceptance action.

A crystal oscillator 246 generates the basic clock frequency for the CPU 1. A frequency divider 247 generates the free-running clock pulses A, B, C and D as shown in FIG. 8. The up level indicates logical 1. Each pulse is active for 55 nanoseconds once every 220 nanoseconds.

The clock controls 245 control the stopping and starting of the gate clock pulses, distribute the clock pulses to the data flow and controls, and generate certain special clock pulses, for main storage timing. The gated clock pulses are of the same form as the A, B, C and D pulses described above, but may be stopped and started by conditions arising in the microprogram as hardware.

The Bus Zero Detect logic 150 is a group of combinatorial logic elements which are capable of determining whether the value on the processor bus is zero. Its output is used by the microprogram in decision-making.

The parity generator and checker circuit 171 checks for odd parity on all bytes received from main storage 8 by the CPU 1. It generates parity on all bytes sent to main storage 8 by the CPU 1. Detection of a processor cycle storage parity error sets the storage parity bit in the PSW register 115 and causes a machine check class interrupt. Detection of a cycle steal cycle storage parity error causes the error condition to be signalled to the active I/O device.

The I/O Interface Parity Generator and Checker 275 checks for odd parity in all bytes received over the I/O interface data bus 2. It generates odd parity on all bytes transmitted over the I/O interface data bus 2. Detection of a parity error on inbound data causes the error condition to be signalled to the active I/O device.

The Halt I/O decoder 161 decodes the Halt I/O command which is executed by the channel 250 rather than by an I/O device. It causes a reset of all I/O devices 4-1 to 4-n attached to the system.

The key selection logic 128 is used to select one of the three AKR keys in register 85 or the cycle steal key via bus 129 for main storage reference. During cycle steals, the I/O cycle steal key is transmitted to the CPU 1 on the Condition Code In Bus 268 of the I/O interface 2. The output 127 of this logic 128 is sent to the translator 9 and to the key compare logic 121.

The key compare logic 121 is used to compare the selected key with the storage protect key from the storage protect array 110. A violation causes the protect check bit in the PSW to be set and an interrupt occurs.

The poll sequence control 285 skews and generates the poll tag on line 213 and poll identifier on bus 266, provides signalling to the interface gate controls 239 for service gate operation, and is the interface device and line out controls 288 for error checking. The poll sequence is to resolve contention between multiple requesting devices for the same CPU resource.

The interface auto control 239 skews and generates the address and service gates for the interface, and provides contention resolution between same, registers cycle steal storage access errors for presentation to the device, provides line signalling to and from the storage controls, and deskews the interface buses and controls the condition code in latches 130.

The interface sequence and time out controls 288 provide the time out controls for sequence error checking on the interface 2, detects invalid combinations of interface tags and reports detection of machine check conditions on the interface to the processor 1.

The I/O interface 2 connects the CPU channel 250 to device attachments 5-1 to 5-n. It consists of the elements described below.

The I/O data bus 269 is a bidirectional bus of 16 data and two parity lines. It is used to transfer data to and from the I/O devies 4-1 to 4-n during direct program control operations and cycle stealing operations, and to transfer device address and interrupt status byte to the CPU 1 during interrupt acceptance.

The I/O address bus 270 is a bidirectional bus of 16 lines used to pass each device address for device selection and I/O commands to I/O devices 4-1 to 4-n during direct program controlled operations. It is also used to transfer main storage addresses from the active I/O device to the CPU 1 during cycle steal operation.

The I/O interface control signals on lines 267-1 to 267-10 are a group of signals used to pass condition codes to the CPU 1, to post status to I/O devices 4-1 to 4-n, to select and control IPO operations, to transfer interrupt and cycle steal requests to the CPU 1, to poll and control acceptance sequences for interrupt and cycle steal, to control resets, and to provide proper sequencing of direct program control and cycle steal operations.

The device attachments 5-1 to 5-n control and attach I/O devices 4-1 to 4-n to the I/O Interface 2. An attachment such as 5-1 may control more than one I/O device such as 4-1.

The storage/translator interface 3 includes a main storage bus consisting of address bus 137 for addressing main storage 8, and to transfer logical and physical storage addresses between the CPU 1 and relocation translator 9, and busses 138 and 139 to transfer data between main storage 8 and the CPU 1 and between the relocation translator 9 and the CPU 1.

The interface 3 also includes the CPU/Translator Control Signal buses 127, 136 and 135 to transfer active address keys, check conditions, and synchronization signals between the CPU 1 and relocation translator 9.

The inner storage control signal bus 12 provides physical selection of the inner storage area 14, partial array selection in the selected area, and read/write control signals properly sequenced for accessing the zero to sixty-four kilobyte range of inner main storage area 14.

The console 6 provides both operator and programmer with comprehensive access to CPU 1 data flow elements and to main storage 8. It attaches to the CPU by a microprogram controlled interface integrated into the data flow of the CPU 1.

MICRO-PROGRAM CONTROL (FIGS. 6-9)

Figure 9:
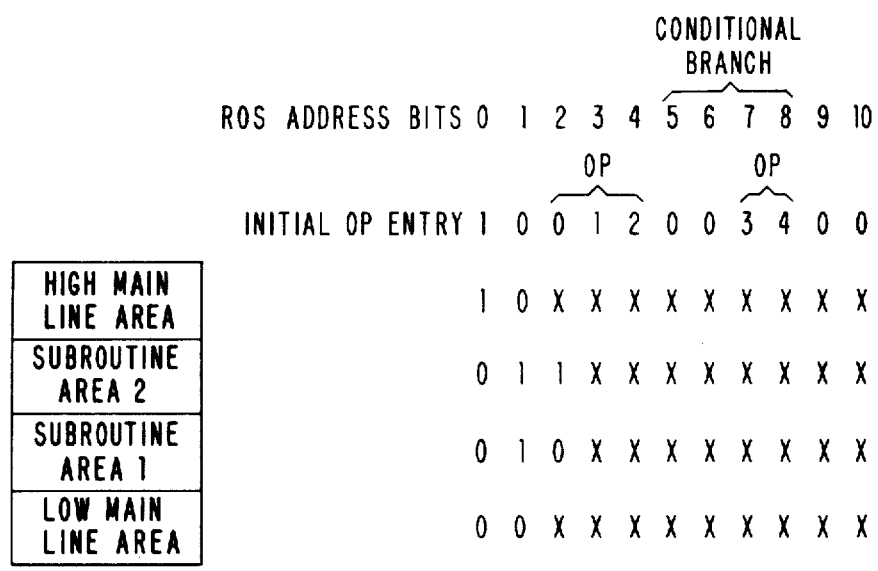
FIG. 9 is a map of the various areas in the read only storage of the present processor.

FIGS. 6 and 7 show the data flow and format of the processor 1 of the ROS controls; FIG. 8, the cycle timing; and FIG. 9 is a map of the ROS 201. The microprogram control works on the principle that each machine level instruction uses only as many microcycles as necessary. During each microcycle one "source" may be gated to the bidirectional processor bus 57 and one or more "destinations" may be loaded from this bus 57. In the preferred embodiment, it will be assumed that the processor 1 uses a 32 bit ROS 201. Twenty-two of the bits are used to control the data flow of processor 1 via bus 204b. The next address (NA) field (bits 22-31) of each ROS word supplies via bus 204a the ten low order bits to the ROSAR 193 (FIG. 6). The one high order bit of the ROSAR 193 is supplied by hardware or microcode via a set ROSAR latch 302 and AND gate 303. The buses 204a and 204b together comprise bus 204 of FIG. 2B.

INITIATION OF INSTRUCTION EXECUTION

There are five hardware force entry locations in the ROS as illustrated in FIG. 2B. Each of these entries has one or more hardware conditions (vs instructions) to force the entry, If no hardware force entry occurs, the first five bits of the instruction forces a ROS entry as shown in the upper right portion of FIG. 9. Note that on instruction force entries, the Set ROSAR latch 302 FIG. 6 is set. From this point until the end of the instruction, the Set ROSAR 0 latch 302 along with either the 10 bit Next Address (NA) field from the ROS Data Register (ROSDR) 202 or the contents of one of the 10 bit link registers (ROSLR) 210 or 211 specifies the next ROS work to be executed.

TERMINATING AND INSTRUCTION EXECUTION

Selected hex NA values are decoded by the hardware 205 to select a last microcycle to terminate the instruction being executed, reset the SR1 and SR2 latches 305 and 306 and initiate a new instruction via an initial entry. A reset load or a class interrupt will also terminate the instruction, reset the SR1 and SR2 latches 305 and 306 and force a branch to the start of the microcode.

ROS LINK REGISTERS AND TIMINGS

Every time C clocks the ROS Address Register (ROSAR) 193. Every time A clocks the ROSDR 202. Every time A, except when the Subroutine 1 (SR1) latch 305 is on, clocks ROSAR bits 1-8 into ROS Link Register 1 (ROSLR1) 210 bit 1-8, while ROSAR bits 9-10 go through a two bit incrementer 307, into ROSLR1 210, bits 9-10. The effect of this is to set the ROSLR1 210 to the value of the ROSAR+1 except in the case where the last two bits of the ROSAR 183 are both on, in which case the ROSLR1 210 is set to the value of the ROSAR-3. This is the return address from the first level subroutine back to mainline code.

Every time A, except when the SR2 latch 306 is on, clocks exactly the same value into ROSLR2 211 as described above for ROSLR1 210. This is the second level return address. The SR1 and SR2 latches 305 and 306 (which freeze ROSLR1 210 and ROSLR2 211, respectively) are clocked at Time D.

FIRST LEVEL SUBROUTINE CALL

A subroutine call consists of a branch to a particular area (group of ROS addresses). If a branch is made from the low mainline to subroutine area 1, (FIG. 9) the subroutine return address will be in ROSLR1 210 a the end of Time A. During Time D, the SR1 latch 305 is set, thus freezing this value in ROSLR1 210. The first level subroutine can use any of the ROS addresses except those in subroutine area 2. If a branch is made from the high mainline area to the area above the ROS 201, i.e., 11X XXXX XXXX, the AND circuit 303 between the Set ROSAR 0 latch and ROSAR bit 0 is clocked, resulting in a branch to 01X XXXX XXXX which is exactly the same subroutine call as from the low mainline.

FIRST LEVEL SUBROUTINE EXIT

The first level subroutine returns to mainline code by a NA hex value of 03F which is decoded as a discrete function by the hardware 209. At Time C, the ROSAR 193 is loaded from the ROSLR1 210, thus resuming mainline code at the previously frozen subroutine return address. At the next Time D, the SR1 latch 305 is reset. Note that if the calling location was in the high mainline area, the return will be back to the high mainline area since the Set ROSAR 0 latch 302 is still on and the set to ROSAR bit 1 will be off. The last microcycle decode also forces a subroutine exit.

SECOND LEVEL SUBROUTINE CALL

If a branch is made to Subroutine Area 2, the subroutine return address is frozen in ROSLR2 211 via the SR2 latch 306 in the same manner as described above for the first level call. The second level subroutine can use any of the ROS addresses.

SECOND LEVEL SUBROUTINE EXIT

The second level subroutine returns to the first level subroutine by a NA hex value of 03E. At Time C, the ROSAR 193 is loaded from the ROSLR2 211, thus resuming first level subroutine code at the previously frozen subroutine return address. At the next Time D, the SR2 latch 306 is reset. The last microcycle decode also forces a subroutine exit.

A second level subroutine can return directly to mainline by using a 03F next address. At Time C, the ROSAR 193 is loaded from ROSLR1 210, thus resuming mainline at the previously frozen subroutine return address. At the next Time D, both the SR1 and SR2 latches 305 and 306 are reset, thus allowing a new subroutine call after only one word of mainline code.

FIRST LEVEL SUBROUTINE IN SUBROUTINE AREA 2

If a branch is made from mainline code directly to Subroutine Area 2 (NA bits 1, 2 = 1, 1), the SR2 latch 306 is set and ROSLR 2 211 is frozen exactly as for a second level call. The exit back to mainline is next address 03E, exactly as for a second level exit. This allows a subroutine in Area 2 to be used either as a first level subroutine or a second level routine.

The returns are summarized below:

CONDITIONAL ROS BRANCHING LOGIC 152

The processor has 4-way, 8-way and 16-way conditional ROS branches. If a conditional branch is selected and the condition is met, the appropriate NA bit is forced on. If one of the NA bits is already on, that condition is a don't care, hence all 4-way branches can be subdivided into 2-way branches, 16-way branches can become 12-way branches, etc.

The NA bits which participate in conditional ROS branches are bits 5–8. Since the NA bits used for returns are bits 9–10, these can be used with conditional ROS branches to do conditional subroutine returns.

For example, if location 00011000010 did a first level subroutine call and the subroutine did a 4-way conditional ROS Branch return, the four return addresses are:
00011000011
00011010011
00011100011
00011110011

ROS BIT DECODES

The control decodes control various operations in the CPU 1. The conditional ROS branches allow the microcode to branch different places depending on machine conditions. The source field specifies what source is to be gated onto the processor bus 57. The destination field specifies one or more destinations to be loaded from the processor bus 57. The next address field specifies the next ROS word to be executed.

EMIT FIELD

There are four destination decodes that not only specify the destination but also to emit ROS bits 0–15 to the processor bus 57 as a source. There are twelve destination decodes that specify to emit ROS bits 8–15 to the processor bus 57. This allows the use of the control/conditional branch field in the same ROS word as the 8 bit Emit. Main Storage Control Decodes - ROS Bits 13-15 (Not Emit)

| Value | | Function |
|---|---|---|
| 0 | No storage cycle | |
| 1 | SR | - Change the next LW or SW to Load or Store Segmentation Register if translator is installed. If translator is not installed, set invalid function program check. |
| 2 | BR | - Block the next LW or SW. The next LIW, LUW, LW or SW can be executed in the second microcycle after the blocked LW or SW. |
| 3 | SBY | - Change the next LW or SW into a byte request instead of a word request. Change the next clock result indicator into a clock byte result indicator and inhibit changing byte 0 in the same word. |
| 4 | LIW | - Load instruction word into SDR using ISK. |
| 5 | LUW | - Load unconditional word into SDR using OPK. |
| 6 | LW | - Load data word (two bytes) into SDR. |
| 7 | SW | - Store data word from SDR into storage. |

TABLE 9

| NA | Loaded | From | ROSAR 193 SR1 305 | SR2 306 | Return To | From | ID |
|---|---|---|---|---|---|---|---|
| 03F | ROSLR1 | | On | Off | Mainline | 1st Level | Area 1 |
| 03F | ROSLR1 | | On | On | Mainline | 2nd Level | Area 2 |
| 03E | ROSLR2 | | On | On | 1st Level | 2nd Level | Area 2 |
| 03E | ROSLR2 | | Off | On | Mainline | 1st Level | Area 2 |

03F resets both the SR1 and SR2 latches
03E resets only the SR2 latch.

OPERATION

The normal storage requests are LIW, LW, and SW. All the others modify these. The four modifying storage control decodes are used to modify common subroutines. The SR, BR, and SBY decodes are executed before a common subroutine containing the LW or SW they are to modify. These there have no effect on LIW. The BTR decode is executed immediately following a LIW, LW, or SW in the last word of a common subroutine.

The SBY decode not only modifies later storage control decodes (LW and SW), but also modifies later clocking of result indicators to operate only on 8 bits instead of 16 bits.

PRIORITY OF MODIFYING REQUESTS

BR is top priority and resets SR and SBY
SR is second priority and resets SBY
SBY is lowest priority FIGS. 10-14 have been shown to illustrate various cycle timings in the preferred processor within which implementation of the improvement is intended.

Figures 10, 11:
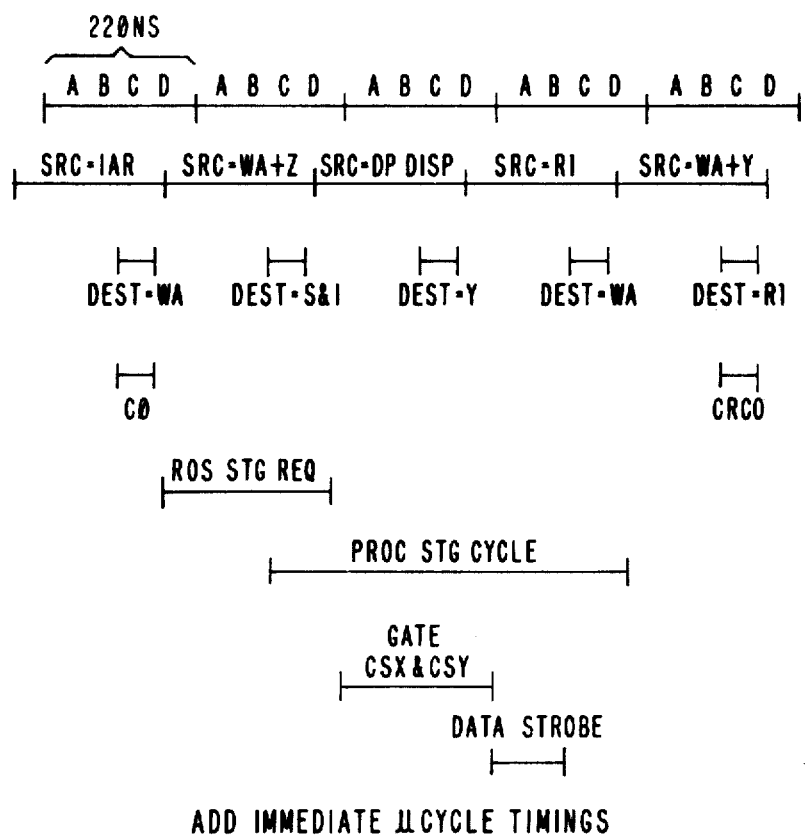
FIGS. 10 and 11, respectively, illustrate the microprogram routine which is executed to perform an exemplary machine level instruction "add immediate" and the basic timing cycles for the add immediate routine.

FIG. 10 illustrates the five microinstructions which are executed to perform a machine level Add Immediate instruction and FIG. 11 illustrates the timing of the source, destination and storage accessing during the execution of the five microinstructions.

Figure 12:
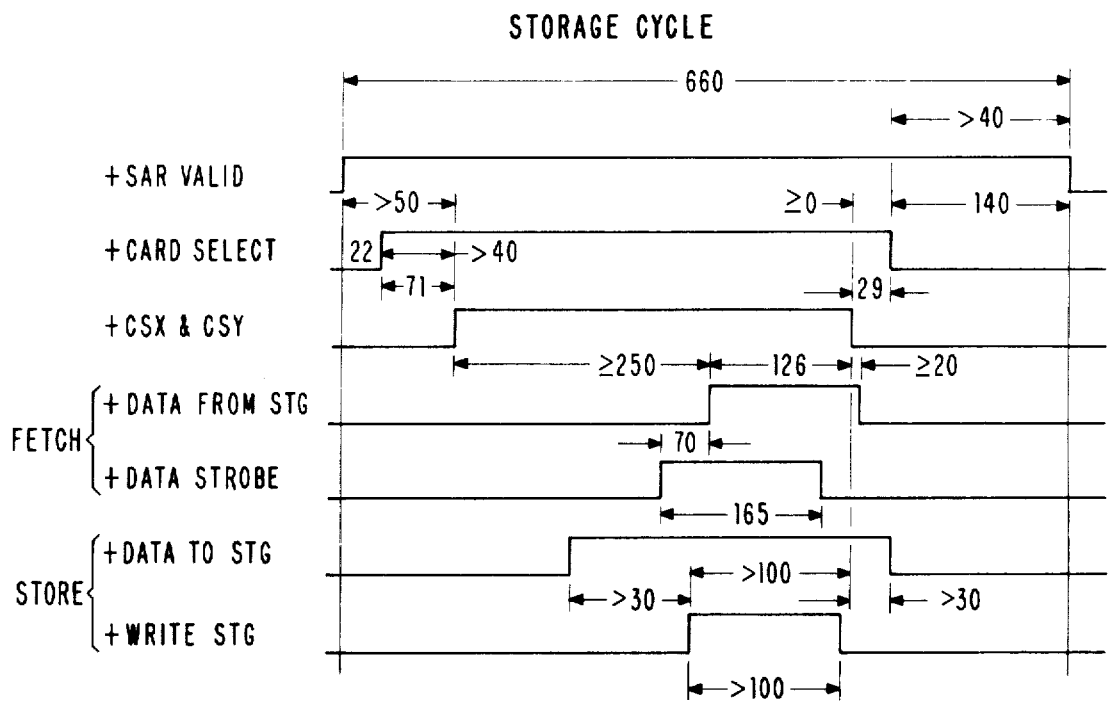
FIG. 12 illustrates the timing of storage cycles.

FIG. 12 illustrates the cycle timings of the main storage controls.

Figure 13:
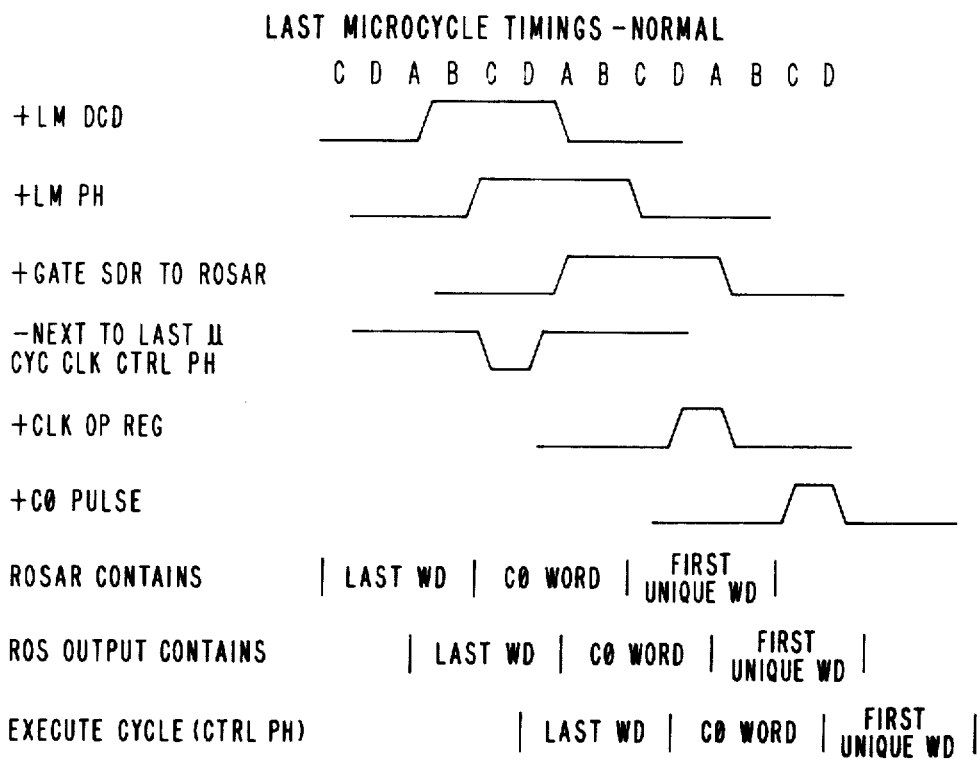
FIGS. 13 and 14 are timing diagrams which illustrate the execution of the last microprogram word in each machine level execution routine.
Figure 14:
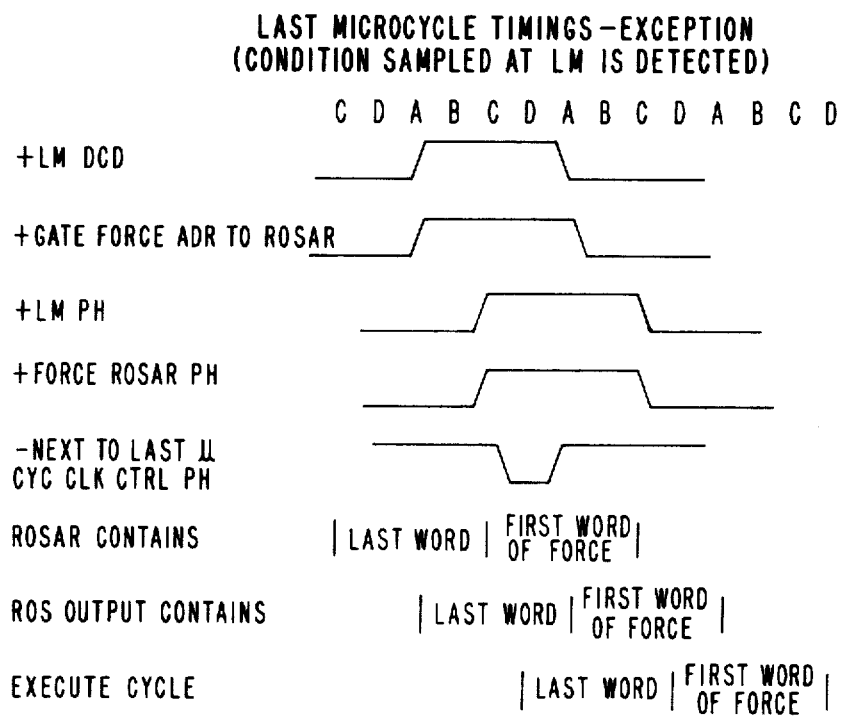

FIGS. 13 and 14 illustrate the cycle timings of the microinstruction type which is executed as the last microinstruction of each routine for executing machine level instructions. Depending upon the detection of (or failure to detect) a sampled condition, either the timing of FIG. 13 or FIG. 14 is effected.

INTERRUPTIONS

A brief description of a preferred form of interruption handling will be made, by way of example, to provide a preferred environment within which the improved level switching mechanism operates.

Efficient operation of a central processor such as 1 depends on prompt response to I/O device service requests. This is accomplished by an interruption scheme that stops the current processor operation, branches to a device service routine, handles device service, then returns to continue the interrupted operation. One processor 1 can control many I/O devices 4-1 to 4-17; therefore, an interruption priority is established to handle the more important operations before those of lesser importance. Certain error or exception conditions (such as a machine check) also cause interruptions. These are called class interruptions and are processed in a manner similar to I/O interruptions.

Interruption priority is established by four priority levels of processing. These levels, listed in priority sequence, are numbered 0, 1, 2, and 3 with level 0 having highest priority. Interruption levels are assigned to I/O devices 4-1 to 4-n via program control. This provides flexiblity for reassigning device priority as the application changes.

Each of the four priority levels has its own set of registers LSB level 0 to LSB level 3 in a stack 80 as shown in FIG. 4. These consist of an address key register (AKR), a level status register (LSR), eight general registers (R0-R7), and an instruction address register (IAR). Information pertaining to a level is automatically preserved in these stack hardware registers when an interruption occurs.

I/O and class interruptions include automatic branching to a service routine. Fixed locations in main storage 8 are reserved for branch addresses or points which are referenced during interruption processing. Hardware processing of an interrruption includes automatic branching to a service routine. The processor 1 uses a reserved storage area in main storage 8 for branch information. The reserved area begins at main storage address 0030. The total size of the area depends on the number of interrupting device 4-1 to 4-n attached. One word (two bytes) is reserved for each interrupting device.

The storage locations used for a class interruption each include a level status block (LSB) pointer which points to the first address of an area in main store 8 where a level status block is stored, and a start instruction address (SIA) which points to the first instruction of the service routine.

Each storage word used for an I/O interruption contains a device data block (DDB) pointer which is the address of the first word of a device data block. This word is used to obtain the start instruction address for the service routine.

Interruption masking facilities provide additional program control over the four priority levels. System and level masking are controlled by a summary mask and the interrupt level mask register 175. Device masking is controlled by a device mask in the information transmitted by the Prepare I/O command. Manipulation of the mask bits can enable or disable interruptions on all levels, a specific level, or for a specific device.

As previously stated, four priority interruption levels exist. Each I/O device 4-1 to 4-n is assigned to a level dynamically, dependent on the application. When an interruption on a given level is accepted, that level remains active until a level exit (LEX) instruction is executed or a higher priority interruption is accepted. In the latter case, the processor 1 switches to the higher level, completes execution (including a LEX instruction), then automatically returns to the interrupted-from level. This automatic return can be delayed by other higher priority interruptions.

If an interruption request is pending on the currently active level, it will not be accepted until after execution of a LEX instruction by the current program. If no other level of interruption is pending when a level exit instruction is executed, the processor 1 enters the wait state. In the wait state no processing is performed, but the processor can accept interruptions that are expected to occur.

Supervisor state is entered upon acceptance of all priority interruptions. The priority interruption algorithm is:

1. The summary mask must be on (enabled).
2. The mask bit (interrupt level mask register 175) for the interrupting level must be on (enabled).
3. For I/O interruptions the device must have its device mask bit on (enabled).
4. The interruption request must be the highest priority of the outstanding requests and higher than the current level of the processor.
5. The processor must not be in the stop state.

Class interruptions do not change priority levels. They are processed at the currently active level. If the processor is in the wait state when a class interruption occurs, priority level 0 is used to process the interruption.

PROGRAM CONTROLLED LEVEL SWITCHING

FIG. 3 illustrates the overall preferred system within which the improvement operates. The main storage 8 includes areas in which are stored LSBs for each task, the software programs and a task dispatching program.

Under the control of the task dispatcher LLSB and STLSB instructions are executed by the processor 1 to load LSBs from main storage 8 into level registers in stack 80 and to copy back LSBs from stock 80 to main store 8 as the various tasks are scheduled for execution.

During the execution of the LLSB instruction which causes a new task to be started or continued, the AKR, LSR and IAR register contents in stack 80 associated with the new task are also gated into the hardware registers 85, 90 and 95.

When a current task is suspended the updated contents of the hardware registers 85 and 90 are stored back into the current levels AKR and LSR stack registers in stack 80. The current stack IAR register is continually updated during instruction execution.

Level switching under program control may be accomplished by using the load level status block (LLSB) instruction (in many instances, LLSB requires an earlier store level status block instruction (STLSB):

| LLSB | Word 1 | OP | Rx | Rb |
|------|--------|----|----|-----|
|      | Word 2 |    | Absolute Addr. | |
| STLSB | Word 1 | OP | Rx | Rb |
|       | Word 2 |    | Absolute Addr. | |

This LLSB instruction in general will:

Specify the location of a level status block (LSB) at an effective address in main storage 8 via Rb and the absolute address.

Specify a selected priority level associated with the main storage LSB via Rx.

Load the LSB from the main storage 8 into the hardware stack 80 (FIG. 4) for the selected level.

The effects on the processor 1 caused by execution of the LLSB instruction are determined by three factors:
1. The current execution level.
2. The selected level specified in the LLSB instruction.
3. The state of the in-process flag (bit 9 of the LSR) contained in the main storage LSB.

Execution of the LLSB instruction may result in level switching or a change in the pending status of a level as described in the following sections:

1. Selected Level Lower Priority Than Current Level and In-process Flag On — these conditions cause the selected level to be pending. The selected LSB in main storage 8 is loaded into the stack 80 for the selected level. Subsequent execution of the LEX instruction on the current level causes the selected level to become active providing no higher priority interruptions are being requested.

2. Selected Level Equal to Current Level and In-process Flag On — these conditions cause the selected level to become the current level. The selected LSB in main storage 8 is loaded into the stack 80 for the selected level.

3. Selected Level Higher Priority Than Current Level and In-process Flag On — these conditions cause the selected level to become the current level. The selected LSB in main storage 8 is loaded into the stack 80 for the selected level. This is a level switch to the higher (selected) level and causes the lower level to be pending.

4. Selected Level Lower Priority Than Current Level and In-process Flag Off — these conditiions cause the selected level to be not pending. The selected LSB in main storae 8 is loaded into the stack 80 for the selected level.

5. Selected Level Equal to Current Level and In-process Flag Off — these conditions cause an exit from the current level. The selected LSB in main storage 8 is loaded into the selected level registers of stack 80.

6. Selected Level Higher Priority than Current Level and In-process Flag Off — the selected LSB in main storage 8 is loaded into the selected level register of stack 80.

Figure 5:
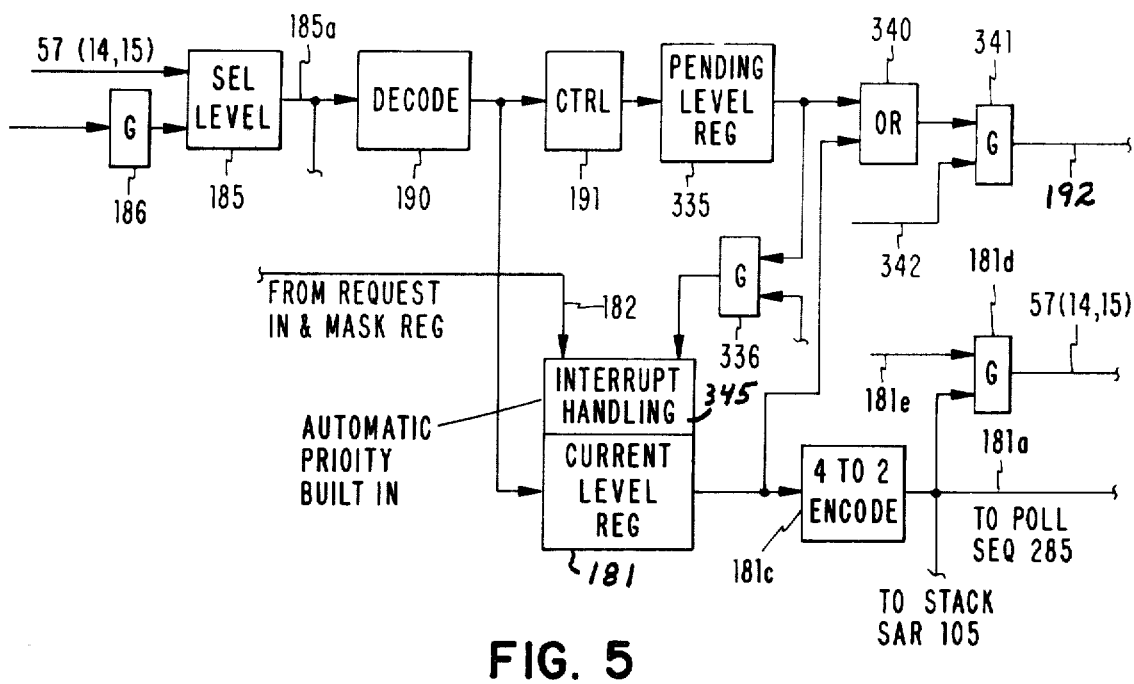
FIG. 5 is a schematic diagram showing the interconnection of various level registers and an interrupt mechanism utilized to achieve the present improvement.

The register 181 (FIG. 5) labeled current level either has no bits on when the system is in the wait state or has only one bit on when action is required by one or more levels as indicated in pending level register 335. This current level bit describes in a bit significant fashion the specific level upon which the processor is currently operating. The circuit elements leading to a set of this register 181 include an interrupt algorithm mechanism 345 which will be described below.

When the microcode actives line 181 e in response to the source decode "source equals current level," the contents of the current level register 181 through the four to two encoder 181c are gated via gate 181d to processor bus 57 bits 14 and 15 and are used for example in establishing the arithmetic relationship between the current level and selected level in the load level status block microcode. The output of the four to two encoder 181c is also sent to the poll and sequence controls 285 to select which interrupt level should be polled.

The pending level register 335 has only three bit positions or latches since level 0 can never be pending because there is no level more important to preempt it. A pending level is one which was being executed but has been interrupted and preempted by a higher level. The output of the pending level register 335 is ORed with the output of the current level register 181 in circuit 340 and is gated to the priority interrupt bus 192 at the request of the microcode by energizing gate 341 in response to the "source is in process latches" decode on line 342. "In process" in this particular context only will collect for the microcode any interrupt level which is either current or pending, so that the microcode can be made aware of which levels activity is either proceeding upon or needs to be proceeded upon when higher level activity ceases. The load level status block instruction (described below) is able to turn on or off interrupt levels by causing sets and/or resets of the appropriate bits in the pending level register 335. If the target level is level 0 and it is required to turn the level on, then the current level bit for level 0 in register 181 automatically becomes active.

As mentioned eariler, the interrupt algorithm is implemented in circuit 345 at the input to the current level bits. These perform a combinatorial function as follows:

The mask and interrupt requests from register 175 and bus 263 are ANDed together in bus 182 (this is a wire AND and not a logical AND) to produce new requests in an attempt to set the current level register 181. When any one of these four bits on bus 182 has a higher priority than that which is in the pending level register 335 or that which is already current in register 181 the highest new request bit may be set into the register 181. Prioritization of external interrupt requests occurs here so that if a request is outstanding for higher level, it will degate any set to the current level bit for the lower level. The two selected level bits of the register 185 are set by microcode and energize the four outputs of their dedicated decoder 190. These are stacked in register 335 for a variety of reasons. One reason is to specify which pending level in register 335 shall be energized to specify which pending level in register 335 shall be energized or deenergized in the course of a load level status block instruction. Another reason is to create inputs for the current level register 181. For instance, when the processor 1 is started after a system reset, level 0 is made active in this fashion so that the machine has a level to run upon.

The preferred embodiment utilizes microprogram routines to control the hardware to manipulating task control information; however, it can alternatively be controlled by sequential logic in known manner.

A preferred form of the microprogram routines for executing LLSB and STLSB instructions will now be described in detail. The LLSB routine is as follows:

LOAD LSB MICROCODE

| SOURCE | ALU CTRL | DEST | STG CNTL | OTHER | WORD NO. |
|---|---|---|---|---|---|
| Stack [Rx] | Pass | Selected Level | | Set Prog. Check if not SVR state | 1 |
| WA | +2 | Stack (IAR) | | | 2 |
| Stack (IAR) | Pass | SAR & WA | LIW | | 3 |
| WA | +2 | Stack (IAR) | | | 4 |
| Stack [Rb] | Pass | Y | | | 5 |
| SDR | Pass | WA | | | 6 |
| WA + Y | Add | SAR & WA | | | 7 |
| WA | Pass | Stack (TEMP) | | | 8 |
| Stack [Rx] | Pass | Y | LW | | 9 |
| Y | Pass | Stack (TEMP 1) | | | 10 |
| WA | +2 | SAR & WA | LW | | 11 |
| SDR | Pass | Stack (IAR) | | | 12 |
| WA | +2 | SAR & WA | LW | | 13 |
| SDR | Pass | Y | | | 14 |
| Y | Pass | Stack [K] | | | 15 |
| SDR | Pass | Y | | | 16 |
| SDR | Pass | Stack [K] | | Shift Y left 1 | 17 |
| WA | +2 | SAR & WA | LW | | 18 |
| Y | Pass | | | Test bus bit 8, set T latch if on | 19 |
| Emit 0008 | Pass | Counter 75 | | | 20 |
| WA | +2 | SAR & WA | LW | | 21 |
| SDR | Pass | Y | | | 22 |
| Y | Pass | Stack [K] | | Dec counter Branch to 21 if counter non-zero | 23 |
| Stack (TEMP J) | Pass | WA | | | 24 |
| Current Level | Pass | Y | | | 25 |
| WA-Y | Subtract | WA | | Branch on T latch and bus negative | 26 |

T = 0 and Bus 57 not negative (In Process off, and Current Level Priority Not Less Than SEL Level)

| | | | | Branch to 37 if bus not zero | 27 |
|---|---|---|---|---|---|
| | | | | Gate pending level latches to current level latches | 28 |
| Current Level | Pass | Selected level | | | 29 |
| Stack (LSR) | Pass | WA | | Reset new level pending | 30 |
| Emit 0040 | Pass | Y | | | 31 |
| WA & Y | And Not | Stack (LSR) | | Branch to 34 if any level action | 32 |
| WA | Pass | LSR | | Set wait state | 33 |
| Stack (IAR) | Pass | SAR | LIW | | 34 |
| Stack (AKR) | Pass | AKR | | | 35 |
| Stack (LSR) | Pass | LSR | | Do not trace | 36 |
| Stack (IAR) | Pass | SAR | LIW | Reset selected level pending | 37 |
| | | | | Do not trace if Tx bit on | 38 |

T = 0 and Bus Negative (In Process Off, and Current level Priority Less than Selected Level)

| | | | | Branch to 37 | 39 |
|---|---|---|---|---|---|

T = 1 and Bus Not Negative (In Process on, and Current Level Priority Not Less than SEL LEVEL PRIORITY)

| | | | | Branch to 46 if bus not zero | 40 |
|---|---|---|---|---|---|
| Stack (IAR) | Pass | SAR | | | 41 |
| Stack (AKR) | Pass | AKR | LIW | | 42 |

-continued

LOAD LSB MICROCODE

| SOURCE | ALU CTRL | DEST | STG CNTL | OTHER | WORD NO. |
|---|---|---|---|---|---|
| Stack (LSR) | Pass | LSR | | Do not trace if TX bit on | 43 |
| | | | | Set selected level pending | 44 |
| | | | | Branch to 37 | 45 |
| Stack (IAR) | Pass | SAR | LIW | Set selected level pending | 46 |
| | | | | Do not trace if Tx bit on | 47 |
| T = 1 and Bus Negative (In Process On, and Current Level Priority Selected Level Priority) | | | | | |
| AKR | Pass | Stack (AKR) | | | 48 |
| LSR | Pass | Stack (LSR) | | Set selected Level pending | 49 |
| Y | Pass | Selected Level | | | 50 |
| | | | | Set selected level (old current level) pending | 51 |
| | | | | Gate pending level (new selected level) to current level | 52 |
| | | | | Branch to 34 | 53 |

Briefly, in the preferred embodiment, an address mode of E/A = [Rb] + 16 bit absolute address is used, where Rb is non-zero. Start conditions for all instructions are: IAR in WA register 52, first word of instruction in SDR and OP registers 70 and 101.

In cycle 1, the selected level from the register specified by the Rx field in the instruction is placed in the selected load latches; and since the instruction is privileged, a check for supervisor state is made. If not the SVR state, a program check interruption occurs.

The second word of the instruction (absolute address) is fetched in cycle 3, and the base register (Rb) in cycle 4. These are added to form the effective address in cycle 7. The selected level [Rx] is moved to TEMP 1 in cycles 9 and 10. IAR is fetched from storage in cycle 9 and stored in the register stack in cycle 12. AKR is fetched in cycle 11 and stored in the register stack in cycle 14. The LSR is fetched in cycle 13 and stored in the register stack in cycle 17. Cycle 19 copies the value of the in process bit from the selected LSB into the T latch 326 for subsequent use. A value of 8 is placed in the counter 75 in cycle 20 and is used as a loop control for eight passes of microcycles 21–23 to move the LSB general purpose registers R0–R7 from main storage 8 to the register stack 80. Cycles 24, 25 and 26 determine if the priority of the current level is less than that of the selected level; and at cycle 26 a four way branch occurs on this condition and the state of the T latch 326 (the In Process bit) as follows:

1. in process bit 1 off and the current level priority not lower than selected level priority; a branch on bus 57 ≠ 0 in cycle 27 determines whether current level = selected level. If not, a branch to cycle 37 occurs, where the selected lower level, is turned off and the next instruction is fetched on the current level (SUSPEND LOWER LEVEL). If the current level and selected level are the same, pending requests are examined in cycles 28 and 29. The in process bit in the current level LSR is turned off in cycles 30–33. If no levels are pending, the wait state is entered. If one or more levels are pending, the highest priority level IAR, AKR and LSR are copied from the register stack 80 into the hardware counterpart registers 95, 85 and 90; and execution continues on that level in cycles 34–37. (SUSPEND CURRENT LEVEL)

2. in process off and current level priority lower than selected level priority: the selected level must already be quiescent (by nature of interrupt algorithm). A branch occurs to cycle 37 where processing is continued on the current level. (CHANGES THE CONTEXT OF A SUSPENDED TASK)

3. in process on and current level priority not lower than selected level priority. A branch on bus = 0 in cycle 40 determines whether current level = selected level. If not, the selected level is set pending in cycle 46 and processing continues on the current level (ENQUEUE LOWER PRIORITY TASK) If the selected and current level priorities are the same, cycles 41, 42 and 43 cause the new selected level IAR, AKR, and LSR to be loaded into the hardware registers 95, 85 and 90. (CHANGE TASKS ON CURRENT LEVEL)

4. In process on and current level priority lower than selected level priority: cycles 48 and 49 save the current level AKR and LSR in the register stack 80. The old current level is set pending during cycles 50 and 51. The newly selected level becomes the new current level in cycle 52. A branch is made to cycle 34 during cycle 53. The new level IAR, AKR and LSR are moved to their hardware counterpart registers 95, 85, and 90 in cycles 34–36 and processing continues on the new, higher priority level. (DISPATCH HIGHER PRIORITY TASK)

The execution of the load LSB microcode routine will now be described in greater detail, reference being directed to the microcode listing. It is assumed that the address mode for deriving the address of the first word of the LSB in main storage 8 is E/A = (Rb) + 16 bit absolute address. Rb is non-zero. The initial conditions for executing instruction microcode are: the address (IAR) of the next instruction word is stored in the WA register 52 and the first word of the instruction being executed (that is, the load LSB) is in the SDR register 70 and in the OP register 101. The execution of each microword will be referred to as a cycle.

The first seven cycles of the microcode listing are utilized to calculate the effective address of the first word of the selected LSB which resides in main storage 8. More particularly, in cycle 1 the Rx field of the current instruction in the OP 101 is gated via gate 101b to the STACK SAR 105 to read out of the stack, the current level register selected by the value of Rx which register position contains the level for the selected LSB. The level bits, which are contained in this register position of stack 80, are destined to the selected level latches 185 by way of the processor but 57 bits 14 and 15. In addition, the supervisory state bit in the hardware LSR register 90 is tested by an output (not shown) of the other control decoders 209 (FIG. 2b); and a program check is set if the current program is not in the supervisory state.

In cycle 2, the address of the next instruction in the WA register is incremented by two in the ALU 51 and the incremented value is stored in the stack (IAR) register of the current level.

In cycle 3, the address in the stack (IAR) register of the current level is destined to the processor SAR register 95 and to the WA register 52. This address in the register 95 is the address of the second word of the load LSB instruction and the storage controls are rendered effective to load this second word of the instruction into the storage data register 70. However, the data from storage will not be available in the SDR 70 until the third succeeding cycle, that is, cycle 6.

In cycle 4, the address value in WA register 52 is incremented by two in the ALU 51 and stored in the stack (IAR) register in the current level.

In cycle 5, the field (Rb) is gated from the OP reg 101 to the stack SAR 105 to cause selection of the register in the current level of the stack 80 which contains the base address corresponding to Rb. This base address value is destined to the Y register 53.

In cycle 6, the absolute address which was accessed from storage in cycle 3 is now available in the processor SDR register 70 and this value is destined from the register 70 to the WA register 52.

In cycle 7, the base address value in the Y register 53 and the 16 bit absolute address value in the WA register 52 are added together in the ALU 51 and the result is destined to both the processor SAR register 95 and to the WA register 52.

In cycle 8, the effective address in the WA register 52 is stored away in the TEMP register of the stack 80.

In cycle 9, the current level register identified by the Rx register bits in the OP REG 101 is selected via stack SAR 105 and is destined to the Y register 53. At the same time, the storage controls are rendered effective to fetch the next word from main storage 8 using the address set in the SAR register 95 during cycle 7. This address in the SAR register 95, is, as indicated earlier, the address of the first word, i.e. the instruction address register IAR, of the selected LSB.

In cycle 10, the selected level bits in the Y register 53 are stored away in the TEMP 1 register of the stack 80. The reason for storing away these bits is that the selected level latches 185 cannot be used as a source. Since these bits must be utilized as described below to determine the relative values of the selected level and the current level, it is necessary to store these values away in TEMP 1 for subsequent use in that operation.

In cycle 11, the storage address in the WA register 52 is updated in the ALU and destined to the WA register 52 and to the processor SAR register 95. The updated address is used to fetch the AKR from main storage 8 and store the AKR away in the selected level of the register stack 80 in cycles 14 and 15.

In cycle 12, the selected level IAR, which is stored in the processor SDR register 70, is destined to the IAR register of the selected level in the stack 80.

In cycle 13, the address in the WA register 52 is updated and destined to the processor SAR register 95 and the WA register 52. The level status register LSR of the selected level status block is fetched making use of the updated address in the SAR register 95. The LSR data will be stored away in the LSR register of the selected level in the stack 80 during cycle 17.

In cycles 14 and 15, the address key register AKR data is resident in the processor SDR register 70 and is destined to the Y register 53 in cycle 14 and from the Y register to the AKR register of the selected level in stack 80 during cycle 15.

In cycle 16, the level status register information is resident in the processor SDR 70 and is destined to the Y register 53.

In cycle 17, the selected level status register LSR bits are transferred from the processor SDR register 70 to the LSR register of the selected level in stack 80. In addition, the LSR bits in the Y register 53 are shifted left one bit position to place the "in process bit" in the bit 8 position of the Y register 53. This permits testing of the "in process" bit 8 during cycle 19 and setting the T latch 326 (FIG. 15) if the in process bit is on.

In cycle 18, the address in the WA register 53 is updated and destined to the processor SAR register 95 and the WA register 52. The updated address and the processor SAR register 95 is used to fetch the next LSB word in main storage 8, in the case the RO register.

A value of 8 is placed in the counter 75 in cycle 20 and is used as a loop control for 8 passes of microcycles 21 - 23 to move the general purpose registers R0- R7 of the selected LSB from main storage 8 to the register stack 80. During this loop control, each time that the stack 80 is addressed by the stack SAR register 105, the address is register 105 is incremented by one in circuit 320 and the new value is placed in the stack link register 321. During the next accessing of stack 80, gate 322 enters the new address value into the register 105. At the same time, the counter 75 is decremented by one (by a hardware decrementer, not shown) for each pass through the loop. Each time that the counter 75 is decremented, it is checked for a zero condition in cycle 23. When non zero is found, a branch is made back to cycle 21, and, when the zero condition is detected, the program continues to cycle 24.

Cycles 24, 25 and 26 determine whether or not the current level priority is less than, equal to or greater than that of the selected level. At cycle 26, a four way branch occurs on this condition and the state of the T latch 326 which provides the value of the in process bit of the selected level. More specifically, in cycle 24 the selected level bits which have been stored away in the TEMP 1 register of the stack 80 are transferred to the WA register 52. The current level bits are destined from the current level latches 181 (FIG. 5) to the Y register 53 during cycle 25. In cycle 26, the current level in the Y register 53 is subtracted from the selected level in the WA register 52 to produce a result at the ALU output 56 which is gated to the processor bus 57 via the source is ALU gate 58.

Figure 15:
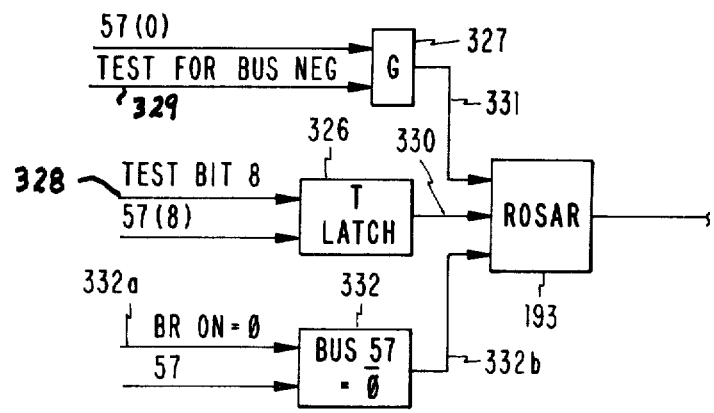
FIG. 15 illustrates certain of the conditional branching logic which is utilized in the preferred embodiment of the present improvement.

As seen in FIG. 15, bit zero of the processor bus 57 is tested for a negative condition via gate 327. The gate 327 of FIG. 15 is a part of the conditional branching logic 152 of FIG. 2a and the test lines 328 and 329 of FIG. 15 originate in the other control decode circuits 209 of FIG. 2b and are a part of the output lines represented generally by the reference numeral 286 in FIG. 2b.

In the preferred embodiment, the four way branch is provided by applying the output 330 of the T latch 326 to bit 5 of the ROSAR 193 and by coupling the output 331 of the gate 327 to bit 6 of the ROSAR 193. It is readily apparent that depending upon one of the four available conditions of the gate 327 and the T latch 326 (i.e. 00,01,10 and 11) that the ROSAR 193 will cause any one of four different locations in the ROS storage 201 to be accessed. In the microcode listing above, these four positions or locations in microprogram storage 201 are indicated by cycles 27, 39, 40 and 48, respectively.

The first branch case to be treated is that in which the T latch 326 is reset because the in process bit was off and in which the output of the bus negative gate 327 is at the logical zero level because the current level has a priority which is not lower than the selected level priority. A branch is made to cycle 27. In cycle 27, a conventional decode circuit 332 checks the input bus 57 for a not zero condition when a signal is applied by the other decode circuits 209 (FIG. 2b) to the input gating line 332a of FIG. 15. If the bus 57 is in a not zero state, a branch is made to cycle 37. However, if the bus 57 equals zero, processing continues at cycle 28. Processing at cycle 28 implies that the current level and the selected level were equal, that is, the selected level is the same as the current level on which task processing has been occurring. In cycle 28, the pending level latches 335 (FIG. 5) are gated to the current level latches 181 by way of gate 336. In cycle 29, the current level bits in the latches 181 are gated into the selected level latches 185 by way of encoder 181c, bus 181a, gate 181d, processor bus 57 bits 14, 15 and gate 186.

In order to turn off the in process bit in the current level LSR register in stack 80, the stack LSR register is destined to the WA register 52 in cycle 30 and in cycle 31 the value 0040 is destined into the Y register 53 from the output of the ROS data register 202, the source is emit field gate 203 and processor bus 57. In cycle 32 the contents of the registers 52 and 53 are entered into the ALU 51 to perform an AND NOT function and the result is destined into the current LSR register in stack 80. This, in effect, turns off the in process bit of the LSB which has just been set in the selected level in cycles 1–26.

Also during cycle 30, the pending level latch in the register 335 (FIG. 5) corresponding to the selected level in latches 185 at the initiation of the routine is reset since its in process bit is off and processing cannot continue on that level.

Also in cycle 32, the current level latches 181 are checked to determine if action is required on any level. The status of the current level latches 181 is dependent upon the previous transfer of the status in the pending level latches 335 to the current level latches 181 during cycle 28. If no action is pending on any of the four levels, cycle 33 causes the level status bits in the WA register 52 to be transferred to the selected level LSR register 90 and the processor is set in the wait state, i.e. no level bit exists in current level register 181.

However, if during cycle 32 it is determined that action is required on one of the four levels, then a branch is made to cycle 34. In cycles 34, 35 and 36, respectively, the stack registers IAR, AKR and LSR of the highest priority pending level are transferred from the stack 80 to hardware registers SAR, AKR and LSR. Also during cycle 34, the next instruction word is fetched from the address stored in the processor SAR register 95. In the cycle following cycle 36, processing of the new instruction word is initiated.

In the even that in cycle 27 a bus equals non-zero condition was detected and a branch was made to cycle 37, a reset of the selected level pending in latches 335 is effected and the next instruction word is fetched making use of the address which is transferred from the current level stack IAR register in stack 80 to the processor SAR register 95. Processing continues on the current level.

In the event that during cycle 26, the in process bit is off and the current level priority is lower than the selected level priority, the selected level must already be in a quiescent state and a branch to cycle 39 is made. If it had not been already in a quiescent state, then it would have already preempted the lower priority task in the current level. In this case, a branch occurs in cycle 39 to cycle 37 wherein processing is continued on the current level by transferring the current level IAR register in the stack 80 to the processor SAR register 95 and fetching a next instruction word in the current level task.

If during the execution of cycle 26, the in process bit is on (the T latch 326 is set), and the current level priority is not lower than the selected level priority, a branch is made to cycle 40. In cycle 40, the circuit 332 tests the bus 57 for a not zero condition. If the bus 57 is in a non-zero condition, a branch is made to cycle 46 to continue processing on the current level. The selected level is set pending in pending latches 335.

However, if the bus 57 is in a zero state, processing continues at cycle 41. In this case, the selected level and the current level are the same; and since the IAR, AKE and LSR information in the selected LSB has been loaded into the corresponding registers of the selected level in stack 80, this information must now be transferred to the hardware registers. Thus in cycles 41, 42 and 43, the stack IAR, the stack AKR and the stack LSR registers of the selected level are destined to the hardware registers 95, 85 and 90. In cycle 44, the selected level is set in the pending level register 335. In cycle 45, a branch is made to cycle 37 wherein processing on the new level is initiated. The IAR register in stack 80 is again destined to the processor SAR register 95 and the next instruction is fetched during cycle 37. Also in cycle 37 the selected level pending latch is again reset since it has been selected for processing.

If during cycle 40, a branch is made to cycle 46 as described above, the address of the next instruction is transferred from the current level IAR register in stack 80 to the processor SAR register 95 to fetch the next instruction word. In addition, the latch in the pending level register 335 corresponding to the selected level is set pending, thus, enqueueing a lower priority task defined by the selected level LSB.

In the event that during cycle 26, a branch is made to cycle 48 as a result of the in process bit being on (T latch 326 set) and the current level priority being lower than the selected level priority (the bus 57 being negative, therefore producing at the output 331 of the gate 327 a logical one signal), the higher priority task will be dispatched on the selected level. In cycles 48 and 49, the contents of the hardware AKR and LSR registers 85 and 90 are transferred respectively to the current level AKR and LSR registers in the stack 80. It is not necessary to update the current level IAR register in the stack 80 because it has already been updated as described above in cycle 4.

In cycle 49, the selected level bits in latches 185 are gated to the pending level register 335 via gate 191 to set the selected level pending.

The old current level value still resides in the Y register 53 (cycle 25) an, in cycle 50 is gated to the selected level register 185. In cycle 51, this old current level value is gated into the pending level register 335 via decode 190 and gate controls 191 to set the old current level pending.

In cycle 52, the new selected level bit is gated from the pending level register 335 to the current level register 181 via gate 336 to dispatch the new higher level task.

In cycle 53, a branch is made to cycle 34. In cycles 34, 35 and 36, the selected level IAR, AKR and LSR registers in the stack 80 have their contents destined to their hardware counterparts, the SAR, AKR and LSR registers 95, 85 and 90, respectively. In cycle 34, the next instruction is fetched using the address in the processor SAR register 95. This fetched instruction is the first instruction in the newly selected task to be executed. The execution of this latter instruction will begin after the execution of cycle 36. Thus, the higher priority selected task is dispatched and the lower priority current level task is set pending.

(Rx) and current level values are compared in cycles 9, 10 and 11 to determine if they are equal. If they are equal, cycles 12 and 13 are executed to update the current LSR and AKR registers in stack 80 from the hardware LSR and AKR registers 90 and 85 prior to storing the current LSB in main store 8. The stack IAR register was already updated in cycle 4.

If the levels are not equal, steps 12 and 13 are omitted and execution continues at cycle 14 where the effective address is recovered from the TEMP register in stack 80 and destined to the WA register 52. A value of 11 decimal is placed in the counter 75 in cycle 15 which is used as a loop control in cycles 16, 17, 18 to store the entire LSB into main storage 8 in a manner similar to that described above with respect to the load LSB microcode. The stack address used [K] increments automatically after use via incrementer 320 register 321 and gate 322. Instruction execution continues at cycle 19, where the next sequential current level instruction is fetched.

One form of LLSB and STLSB effective addressing has been described by way of example: and it will be appreciated that other known address forms can be used.

While the invention has been particularly shown and described with reference to a preferred embodiment thereof, it will be understood by those skilled in the art that changes in form and details may be made therein without departing from the spirit and scope of the invention.

What is claimed is:

1. In a data processing system of the type in which each set of a plurality of sets of registers, one set being provided for each interrupt priority level in the system, interacts with a common main storage and common arithmetic and logic control circuits to execute respective tasks of a program, and in which a task dispatching program means operates in conjunction with priority/interrupt controls to dispatch tasks in a desired sequence to the sets of registers so that each set of registers, the arithmetic and logic unit and the main storage can process a respective task currently assigned to the latter set of registers when its priority is highest,
   in combination with said register sets, storage, control circuits, program means and priority/interrupt controls,

| SOURCE | ALU CTRL | DEST | STG CTRL | OTHER | WORD NO. |
|---|---|---|---|---|---|
| STORE LSB MICROCODE | | | | | |
| Stack [Rx] | Pass | Selected Level | | | 1 |
| WA | + 2 | Stack (IAR) | | | 2 |
| Stack (IAR) | Pass | SAR & WA | LIW | | 3 |
| WA | + 2 | Stack (IAR) | | | 4 |
| Stack [Rb] | Pass | Y | | | 5 |
| SDR | Pass | WA | | | 6 |
| WA & Y | Add | SAR & WA | | | 7 |
| WA | Pass | TEMP | | | 8 |
| Stack [Rx] | Pass | WA | | | 9 |
| Current Level | Pass | Y | | | 10 |
| WA-Y | Subtract | WA | | Branch on not zero to 14 | 11 |
| LSR | Pass | Stack (LSR) | | | 12 |
| AKR | Pass | Stack (AKR) | | | 13 |
| TEMP | Pass | WA | | | 14 |
| Emit 000B | Pass | Counter | | | 15 |
| Stack [K] | Pass | SDR | | | 16 |
| WA | Pass | SAR | SW | | 17 |
| WA + 2 | Pass | WA | | Branch on counter not 0 to 16& decrement counter | 18 |
| Stack (IAR) | Pass | SAR | LIW | | 19 |

In the store LSB microcode routine, current level refers to the task being executed and therefore to the level in stack 80 containing the LSB registers associated with the task being executed. Selected level refers to the task whose LSB register data will be transferred from the corresponding level registers of stack 80 (whether or not they are also the current level register set) to main storage 8.

Cycles 1-8 of the store LSB microcode are used to establish the effective address of the selected LSB as in the execution of the load LSB instruction. The selected apparatus, controlled in accordance with the execution of one machine level task instruction for assisting the dispatching of tasks, comprising a main storage area for holding a task address and status block (LSB) for each task for which execution is to be initiated or continued, means for fetching from main storage the LSB of a selected task and for storing the fetched LSB in the register set of a selected level, means for determining the in-process status of the selected task and the relative priority levels on which said one instruction of a current task is being executed and on which the selected task is intended for execution, and means responsive to said in-process status and said relative priority levels for initiating the execution of the selected task when the in-process status is "on" and the priority level of the selected task is higher than that of the current task.

2. The apparatus of claim 1 together with means for setting the current task pending.

3. In a data processing system of the type in which each set of a plurality of sets of registers, one set being provided for each interrupt priority level in the system, interacts with a common main storage and common arithmetic and logic control circuits to execute respective tasks of a program, and in which a task dispatching program means operates in conjunction with priority/interrupt controls to dispatch tasks in a desired sequence to the sets of registers so that each set of registers, the arithmetic and logic unit and the main storage can process a respective task currently assigned to the latter set of registers when its priority is highest, in combination with said register sets, storage, control circuits, program means and priority/interrupt controls, apparatus, controlled in accordance with the execution of one machine level task instruction for assisting the dispatching of tasks, comprising a main storage area for holding a task address and status block (LSB) for each task for which execution is to be initiated or continued, means for fetching from main storage the LSB of a selected task and for storing the fetched LSB in the register set of a selected level, means for determining the in-process status of the selected task and the relative priority levels on which said one instruction of a current task is being executed and on which the selected task is intended for execution, and means responsive to said in-process status and said relative priority levels for enqueueing the selected task and continuing execution of the current task when the in-process status data is "on" and the priority level of the current task is higher than that of the selected task.

4. In a data processing system of the type in which each set of a plurality of sets of registers, one set being provided for each interrupt priority level in the system, interacts with a common main storage and common arithmetic and logic control circuits to execute respective tasks of a program, and in which a task dispatching program means operates in conjunction with priority/interrupt controls to dispatch tasks in a desired sequence to the sets of registers so that each set of registers, the arithmetic and logic unit and the main storage can process a respective task currently assigned to the latter set of registers when its priority is highest, in combination with said register sets, storage, control circuits, program means and priority/interrupt controls, apparatus, controlled in accordance with the execution of one machine level task instruction for assisting the dispatching of tasks, comprising a main storage area for holding a task address and status block (LSB) for each task for which execution is to be initiated or continued, means for fetching from main storage the LSB of a selected task and for storing the fetched LSB in the register set of a selected level, means for determining the in-process status of the selected task and the relative priority levels on which said one instruction of a current task is being executed and on which the selected task is intended for execution, and means responsive to said in-process status and said relative priority levels for changing from execution of the current task to execution of the selected task on the same priority level when the in-process states data is "on" and the selected and current priority levels are the same.

5. In a data processing system of the type in which each set of a plurality of sets of registers, one set being provided for each interrupt priority level in the system, interacts with a common main storage and common arithmetic and logic control circuits to execute respective tasks of a program, and in which a task dispatching program means operates in conjunction with priority/interrupt controls to dispatch tasks in a desired sequence to the sets of registers so that each set of registers, the arithmetic and logic unit and the main storage can process a respective task currently assigned to the latter set of registers when its priority is highest, in combination with said register sets, storage, control circuits, program means and priority/interrupt controls, apparatus, controlled in accordance with the execution of one machine level task instruction for assisting the dispatching of tasks, comprising a main storage area for holding a task address and status block (LSB) for each task for which execution is to be initiated or continued, means for fetching from main storage the LSB of a selected task and for storing the fetched LSB in the register set of a selected level, means for determining the in-process status of the selected task and the relative priority levels on which said one instruction of a current task is being executed and on which the selected task is intended for execution, and means responsive to said in-process status and said relative priority levels for continuing execution of the current task and maintaining the selected task suspended when the in-process status data is "off" and the priority level of the selected task is higher than that of the current task.

6. In a data processing system of the type in which each set of a plurality of sets of registers, one set being provided for each interrupt priority level in the system, interacts with a common main storage and common arithmetic and logic control circuits to execute respective tasks of a program, and in which a task dispatching program means operates in conjunction with priority/interrupt controls to dispatch tasks in a desired sequence to the sets of registers so that each set of registers, the arithmetic and logic unit and the main storage can process a respective task currently assigned to the latter set of registers when its priority is highest, in combination with said register sets, storage, control circuits, program means and priority/interrupt controls, apparatus, controlled in accordance with the execution of one machine level task instruction for assisting the dispatching of tasks, comprising a main storage area for holding a task address and status block (LSB) for each task for which execution is to be initiated or continued, means for fetching from main storage the LSB of a selected task and for storing the fetched LSB in the register set of a selected level, means for determining the in-process status of the selected task and the relative priority levels on which said one instruction of a current task is being executed and on which the selected task is intended for execution, and means responsive to said in-process status and said relative priority levels for continuing execution of the current task and suspending the selected task when the in-process status data is "off" and the priority level of the current task is higher than that of the selected task.

7. In a data processing system of the type in which each set of a plurality of sets of registers, one set being provided for each interrupt priority level in the system, interacts with a common main storage and common arithmetic and logic control circuits to execute respective tasks of a program, and in which a task dispatching program means operates in conjunction with priority/interrupt controls to dispatch tasks in a desired sequence to the sets of registers so that each set of registers, the arithmetic and logic unit and the main storage can process a respective task currently assigned to the latter set of registers when its priority is highest, in combination with said register sets, storage, control circuits, program means and priority/interrupt controls, apparatus, controlled in accordance with the execution of one machine level task instruction for assisting the dispatching of tasks, comprising a main storage area for holding a task address and status block (LSB) for each task for which execution is to be initiated or continued, means for fetching from main storage the LSB of a selected task and for storing the fetched LSB in the register set of a selected level, means for determining the in-process status of the selected task and the relative priority levels on which said one instruction of a current task is being executed and on which the selected task is intended for execution, and means responsive to said in-process status and said relative priority levels for suspending execution of the current task, examining the priority/interrupt controls for tasks pending on other levels and initiating execution of the highest priority pending task if one or more tasks are pending.

8. In a data processing system of the type in which each set of a plurality of sets of registers, one set being provided for each interrupt priority level in the system, interacts with a common main storage and common arithmetic and logic control circuits to execute respective tasks of a program, and in which a task dispatching program means operates in conjunction with priority/interrupt controls to dispatch tasks in a desired sequence to the sets of registers so that each set of registers, the arithmetic and logic unit and the main storage can process a respective task currently assigned to the latter set of registers when its priority is highest, in combination with said register sets, storage, control circuits, program means and priority/interrupt controls, a method of executing one machine level task instruction to assist the dispatching of tasks, comprising maintaining in main storage areas a task address and status block (LSB) for each task for which execution is to be initiated or continued, fetching from main storage the LSB of a selected task and storing the fetched LSB in the register set of a selected level, determining the in-process status of the selected task and the relative priority levels on which said one instruction of a current task is being executed and on which the selected task is intended for execution, and executing one of the following mutually exclusive steps in response to said in-process status and said relative priority levels:

a. initiating the execution of the selected task when the in-process status is "on" and the priority level of the selected task is higher than that of the current task, b. enqueueing the selected task and continuing execution of the current task when the in-process status data is "on" and the priority level of the current task is higher than that of the selected task, c. changing from execution of the current task to execution of the selected task on the same priority level when the in-process states data is "on" and the selected and current priority levels are the same, d. continuing execution of the current task and maintaining the selected task suspended when the in-process status data is "off" and the priority level of the selected task is higher than that of the current task, e. continuing execution of the current task and suspending the selected task when the in-process status data is "off" and the priority level of the current task is higher than that of the selected task, f. suspending execution of the current task, examining the priority/interrupt controls for tasks pending on other levels and initiating execution of the highest priority pending task if one or more tasks are pending.

9. The system of claim 1 wherein the determining means includes a latch for storing the in-process status of a selected task, means for transferring the in-process status from the LSB in the selected level register set to the latch, a current level register normally storing the level in which the current task is being executed, a selected level register for storing the level selected for execution of the selected task, and means controlled in accordance with the single machine instruction for transferring the level selected for the selected task from the LSB in the current level register set to the selected level register, and means for comparing the relative values of the current and selected levels.

10. The system of claim 2
wherein the means for setting the current task pending includes a pending level register,
means for transferring the current level value into the selected level register, and
means for gating the current level value from the selected level register to the pending level register.

11. The system of claim 10 further comprising
means for subsequently gating the highest priority level stored in the pending level register to the current level register to continue execution of a pending task when a selected task replaces a current task on the same level with the in-process bit off in the selected task LSB.

* * * * *